United States Patent
Shohara

(10) Patent No.: US 11,375,263 B2
(45) Date of Patent: Jun. 28, 2022

(54) IMAGE CAPTURING APPARATUS, IMAGE DISPLAY SYSTEM, AND OPERATION METHOD

(71) Applicant: Ricoh Company, Ltd., Tokyo (JP)

(72) Inventor: Makoto Shohara, Tokyo (JP)

(73) Assignee: RICOH COMPANY, LTD., Tokyo (JP)

(*) Notice: Subject to any disclaimer, the term of this patent is extended or adjusted under 35 U.S.C. 154(b) by 1 day.

(21) Appl. No.: 16/640,380

(22) PCT Filed: Aug. 13, 2018

(86) PCT No.: PCT/JP2018/030188
§ 371 (c)(1),
(2) Date: Feb. 20, 2020

(87) PCT Pub. No.: WO2019/044475
PCT Pub. Date: Mar. 7, 2019

(65) Prior Publication Data
US 2021/0076091 A1    Mar. 11, 2021

(30) Foreign Application Priority Data
Aug. 29, 2017 (JP) ............................ JP2017-164794

(51) Int. Cl.
*H04N 21/422* (2011.01)
*G06F 3/0346* (2013.01)
(Continued)

(52) U.S. Cl.
CPC ..... *H04N 21/42222* (2013.01); *G06F 3/0346* (2013.01); *H04N 7/183* (2013.01); *H04N 21/4223* (2013.01)

(58) Field of Classification Search
CPC ......... H04N 21/42222; H04N 21/4223; H04N 7/183; G06F 3/0346
(Continued)

(56) References Cited

U.S. PATENT DOCUMENTS 9,013,544 B2    4/2015   Satoh et al.
9,110,273 B2    8/2015   Masuda et al.
(Continued)

FOREIGN PATENT DOCUMENTS

EP    3067855 A1    9/2016
JP    4394742       1/2010
(Continued)

OTHER PUBLICATIONS

International Search Report and Written Opinion dated Nov. 27, 2018 in PCT/JP2018/030188 filed on Aug. 13, 2018.
(Continued)

*Primary Examiner* — John W Miller
*Assistant Examiner* — Omer Khalid
(74) *Attorney, Agent, or Firm* — Xsensus LLP

(57) ABSTRACT

An image capturing apparatus is provided that is configured to generate an operation screen relating to an image stored in a storage unit, output the generated operation screen to a display apparatus, acquire attitude information relating to an attitude of the image capturing apparatus, converting the acquired attitude information into position information relating to a position of a position display component on the operation screen and display the position display component on the operation screen based on the converted position information, accept an initialization operation of initializing the position of the position display component, and display the position display component at an initial position of the operation screen in response to accepting the initialization operation.

9 Claims, 25 Drawing Sheets

(51) Int. Cl.
*H04N 7/18* (2006.01)
*H04N 21/4223* (2011.01)

(58) Field of Classification Search
USPC .................................. 348/734, 36, 207.1
See application file for complete search history.

(56) References Cited

U.S. PATENT DOCUMENTS

| | | |
|---|---|---|
| 9,185,279 B2 | 11/2015 | Masuda et al. |
| 9,307,144 B2 | 4/2016 | Tanaka et al. |
| 9,392,167 B2 | 7/2016 | Shohara et al. |
| 9,413,955 B2 | 8/2016 | Satoh et al. |
| 9,456,113 B2 | 9/2016 | Masuda et al. |
| 9,491,357 B2 | 11/2016 | Shohara et al. |
| 9,507,436 B2 | 11/2016 | Aoki et al. |
| 9,584,694 B2 | 2/2017 | Ito et al. |
| 9,596,408 B2 | 3/2017 | Tanaka et al. |
| 9,607,358 B2 | 3/2017 | Takenaka et al. |
| 9,736,372 B2 | 8/2017 | Masuda et al. |
| 9,739,983 B2 | 8/2017 | Masuda et al. |
| 9,756,243 B2 | 9/2017 | Shohara et al. |
| 9,798,117 B2 | 10/2017 | Satoh et al. |
| 10,382,681 B2 | 8/2019 | Masuda et al. |
| 2008/0174551 A1* | 7/2008 | Ishibashi ............ H04N 21/4223 345/158 |
| 2012/0194427 A1* | 8/2012 | Lee .................... G06F 3/033 345/157 |
| 2013/0235149 A1 | 9/2013 | Tanaka et al. |
| 2014/0071227 A1 | 3/2014 | Takenaka et al. |
| 2014/0078247 A1 | 3/2014 | Shohara et al. |
| 2016/0269632 A1* | 9/2016 | Morioka ................ G06T 3/60 |
| 2017/0116704 A1 | 4/2017 | Takenaka et al. |
| 2017/0310895 A1 | 10/2017 | Masuda et al. |
| 2017/0315336 A1 | 11/2017 | Masuda et al. |
| 2018/0024333 A1 | 1/2018 | Satoh et al. |
| 2018/0139405 A1* | 5/2018 | Baek ................ H04N 21/42204 |
| 2018/0260945 A1 | 9/2018 | Shohara |

FOREIGN PATENT DOCUMENTS

| | | |
|---|---|---|
| JP | 2011-099980 | 5/2011 |
| JP | 2014-206866 | 10/2014 |
| JP | 2018-152646 | 9/2018 |
| KR | 10-2006-0084694 A | 7/2006 |

OTHER PUBLICATIONS

Kubota, Satoru. (2012). "Ergonomic Design Guidelines for Flat Panel Display Televisions". Japan Ergonomics Society 53$^{rd}$ Conference.

Office Action dated Jul. 13, 2021 in Japanese Patent Application No. 2017-164794, 3 pages.

* cited by examiner

[Fig. 1A]
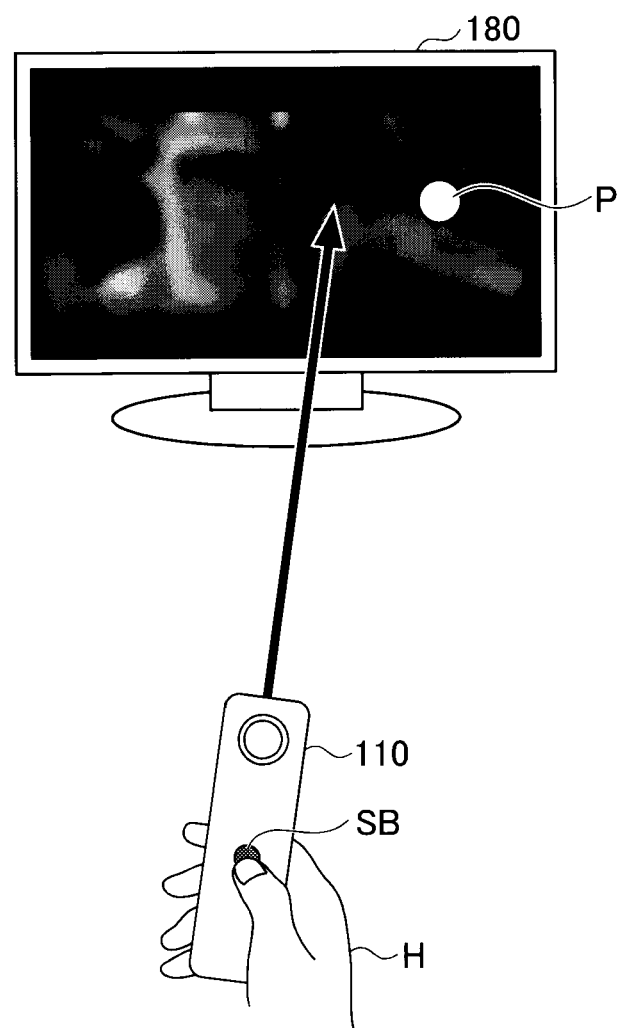

[Fig. 1B]
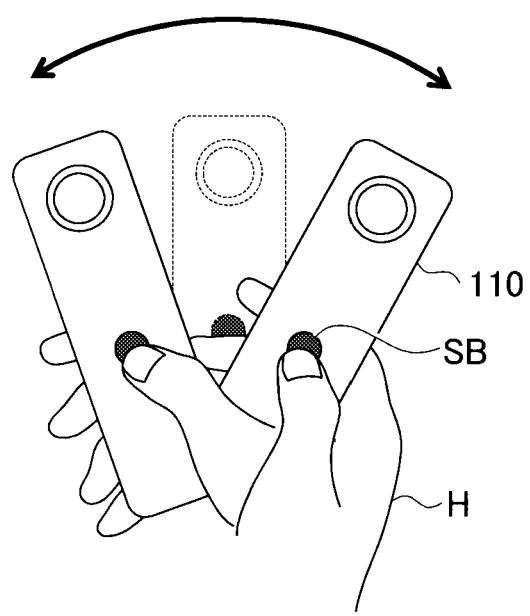

[Fig. 1C]
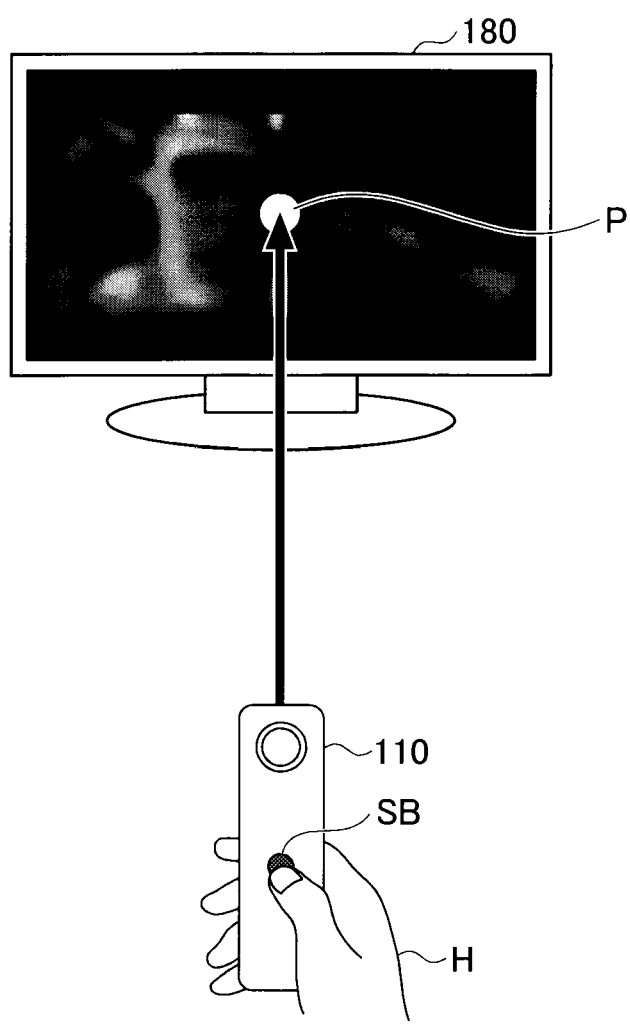

[Fig. 2]
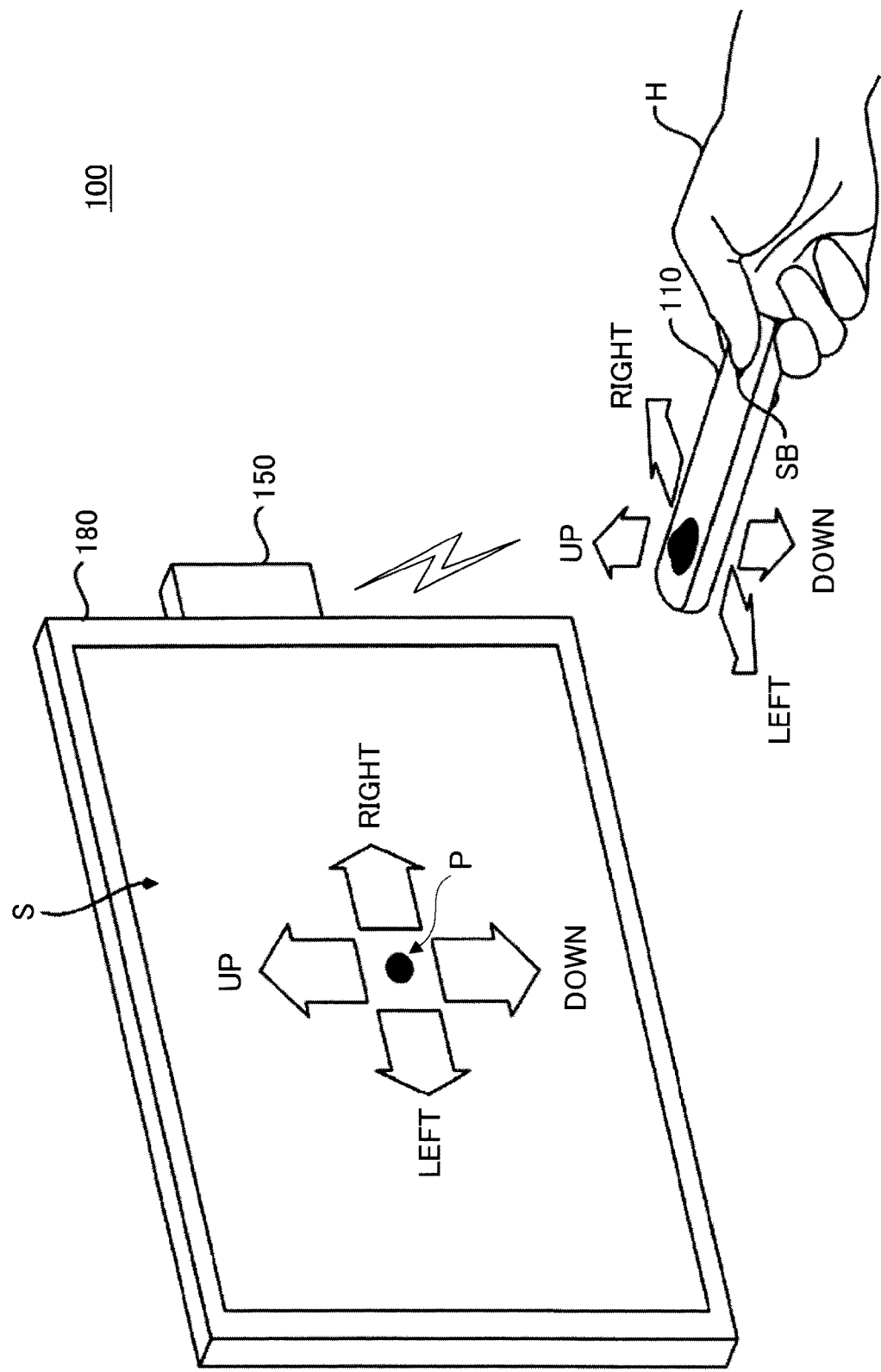

[Fig. 3]
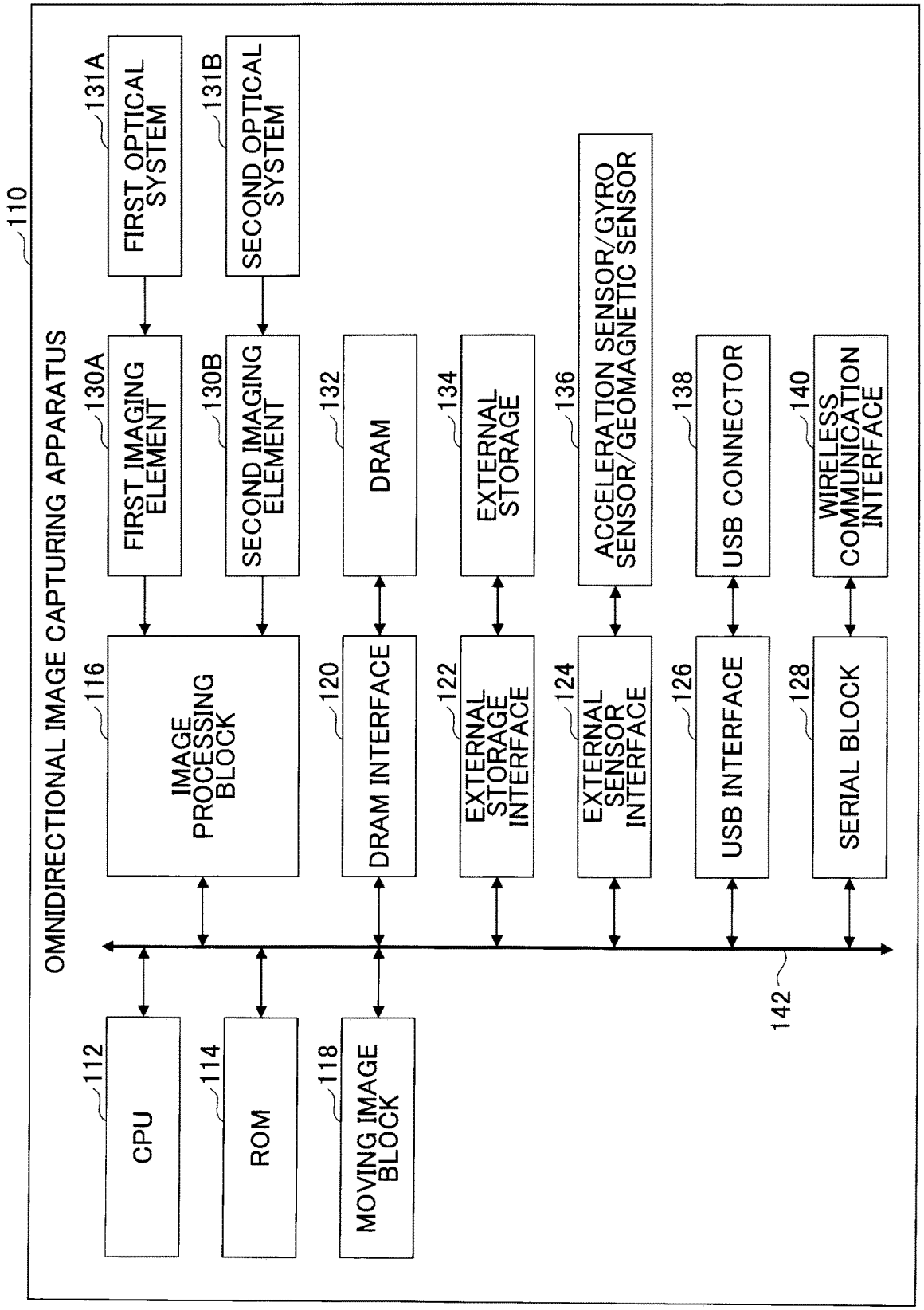

[Fig. 4]
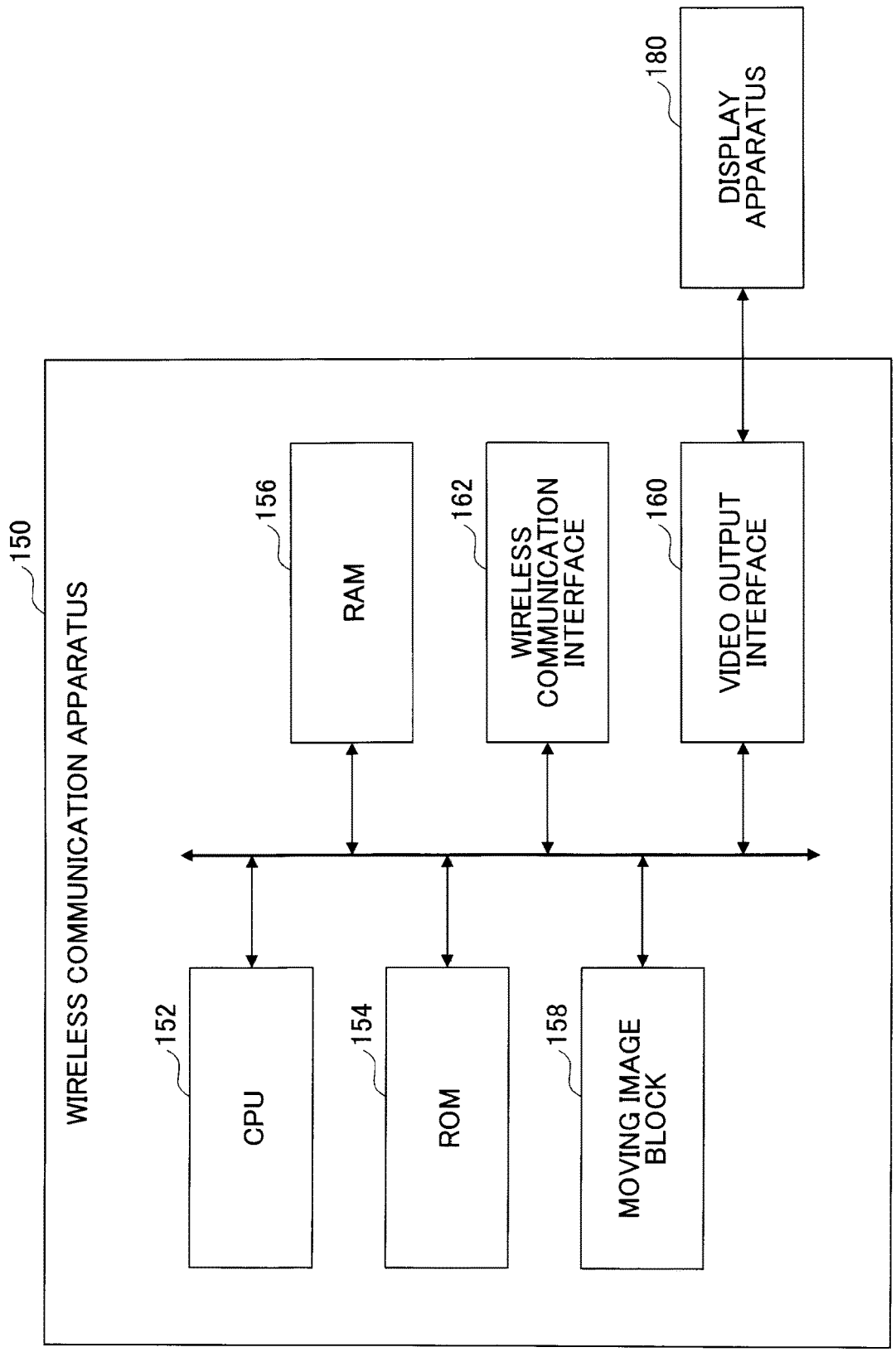

[Fig. 5]
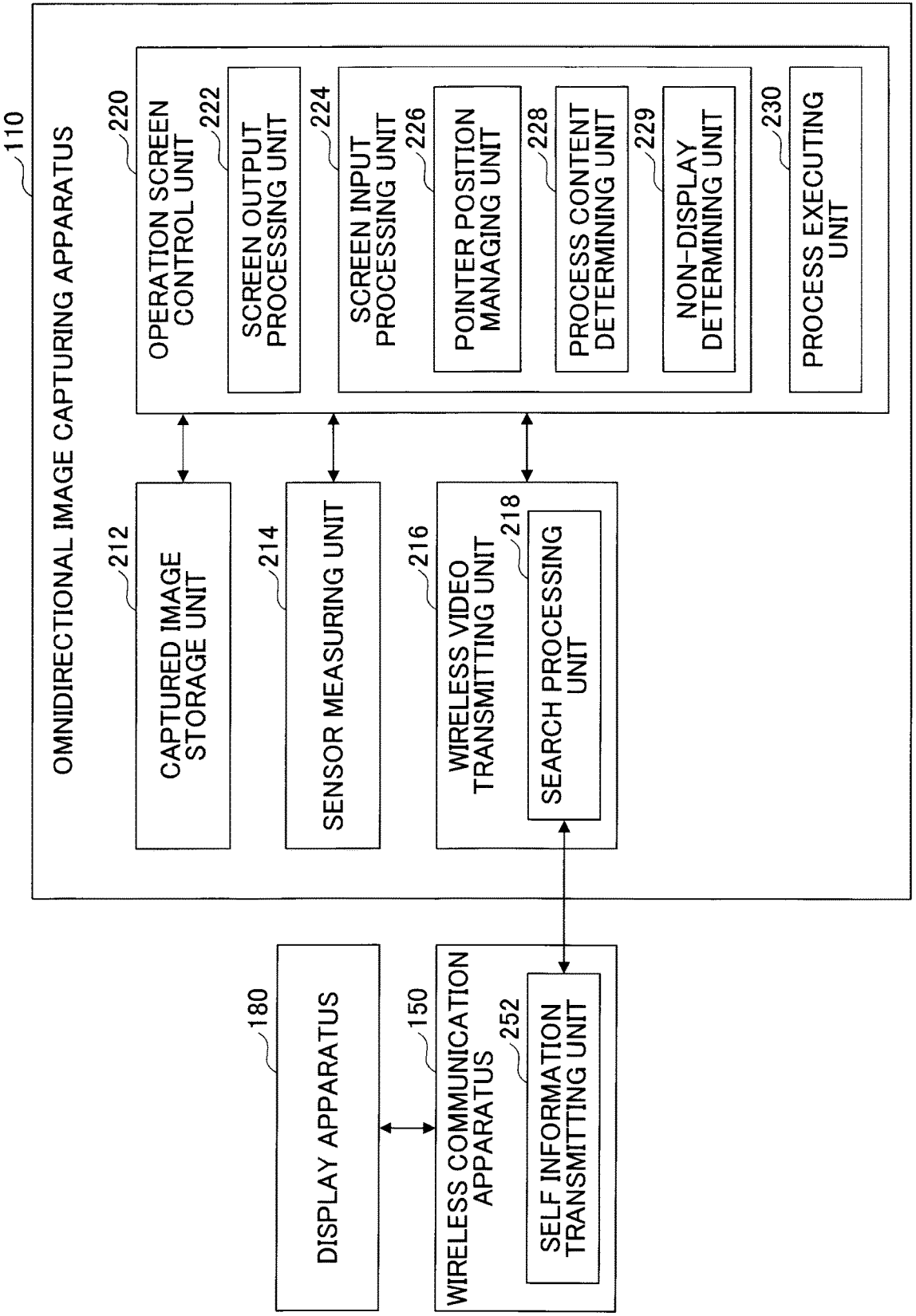

[Fig. 6]
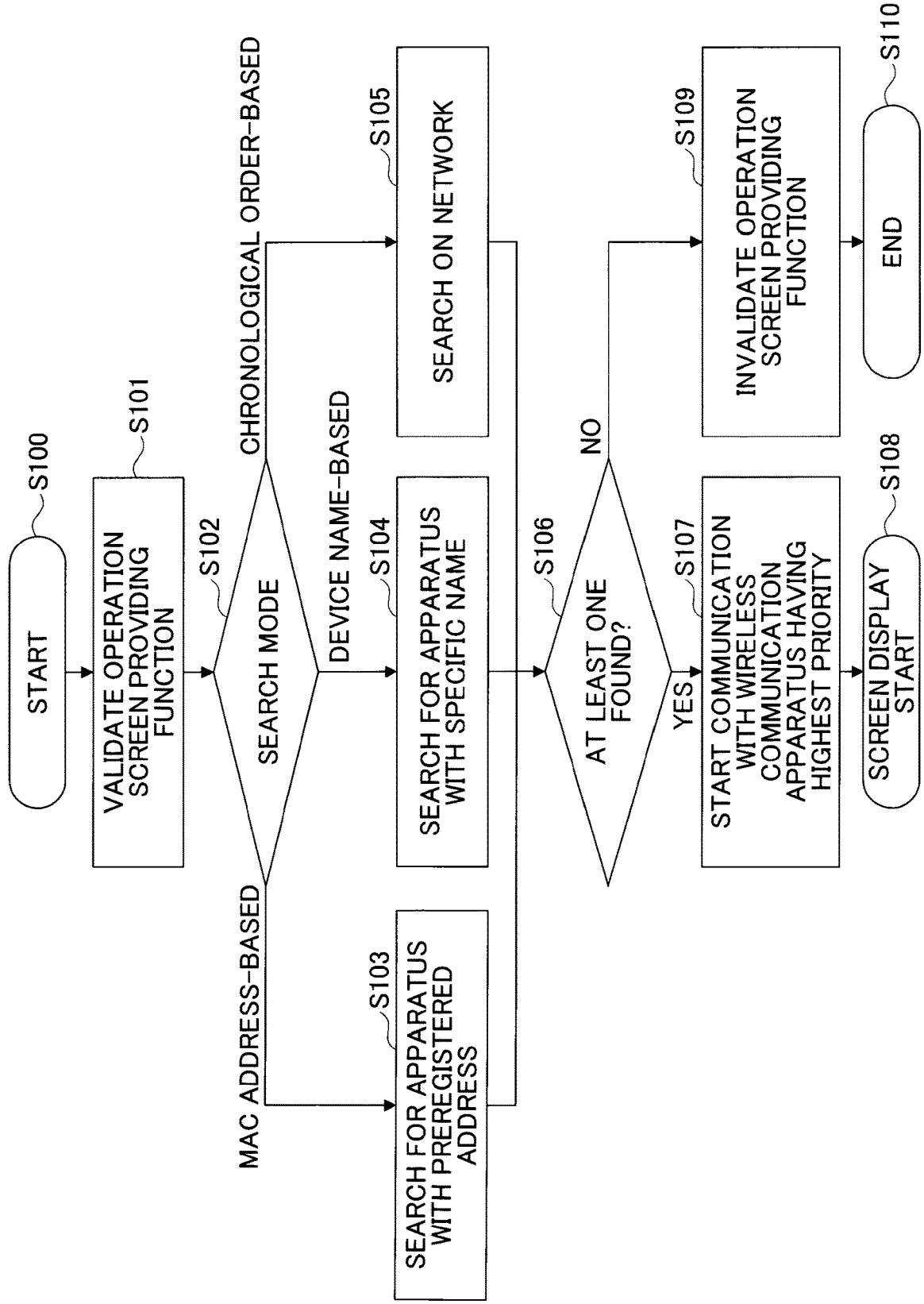

[Fig. 7]
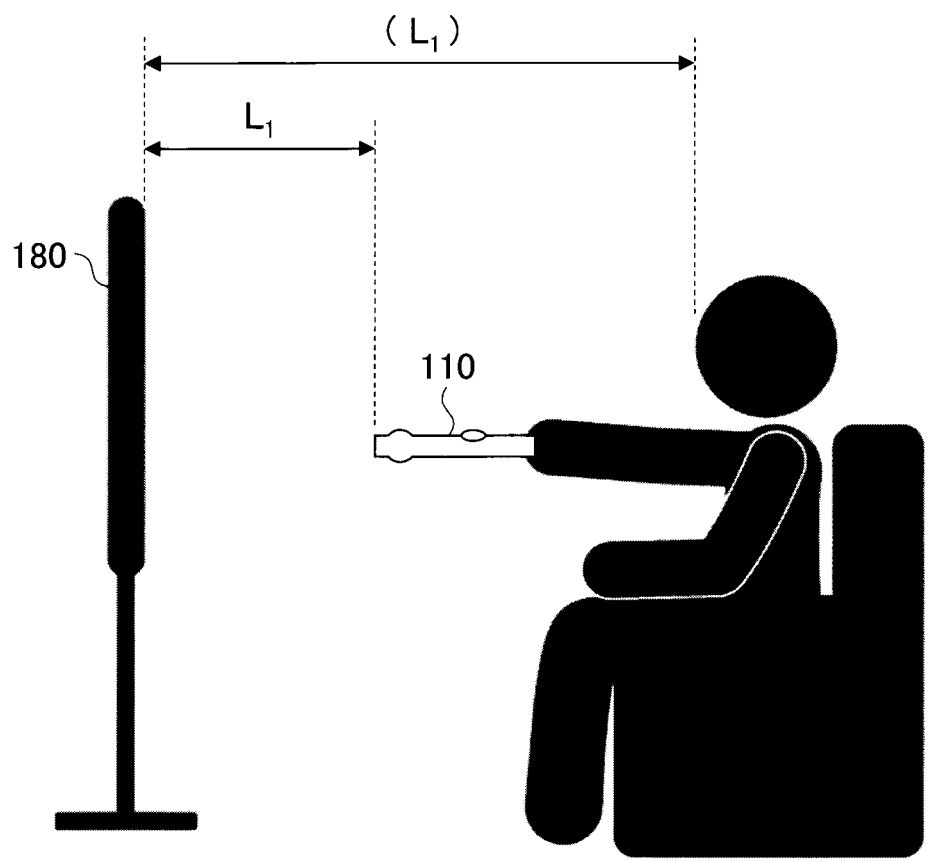

[Fig. 8]
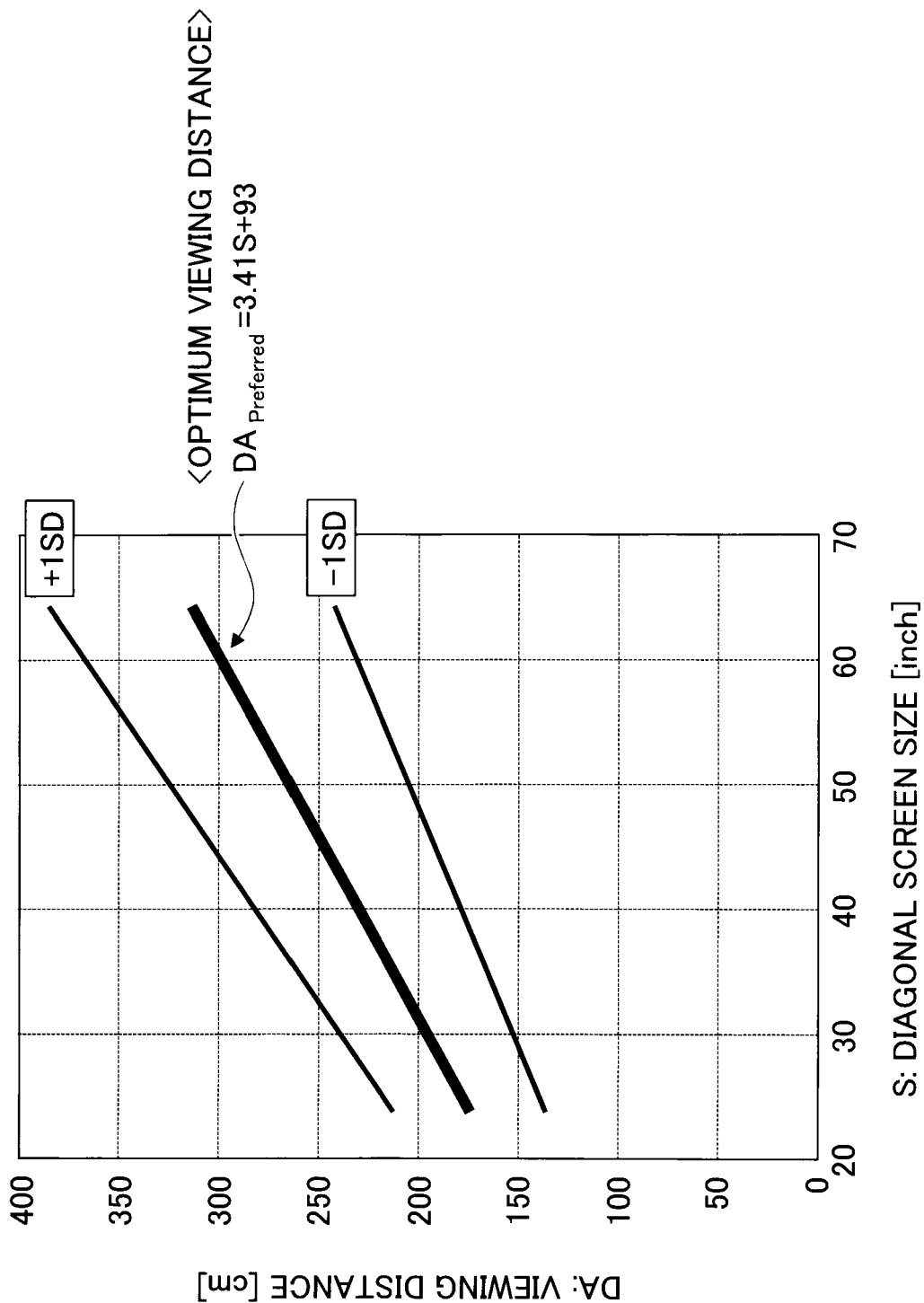

[Fig. 9A]
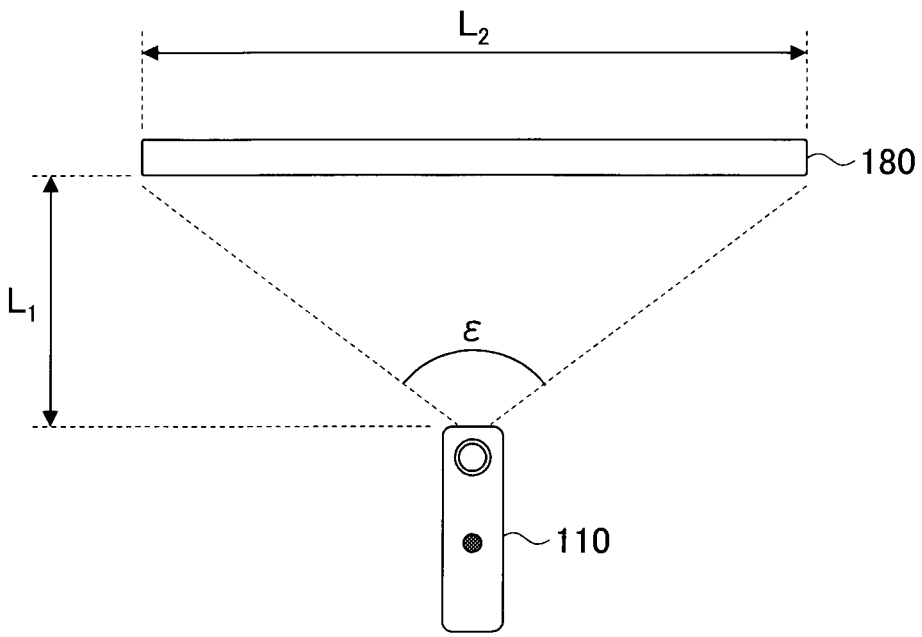
[Fig. 9B]
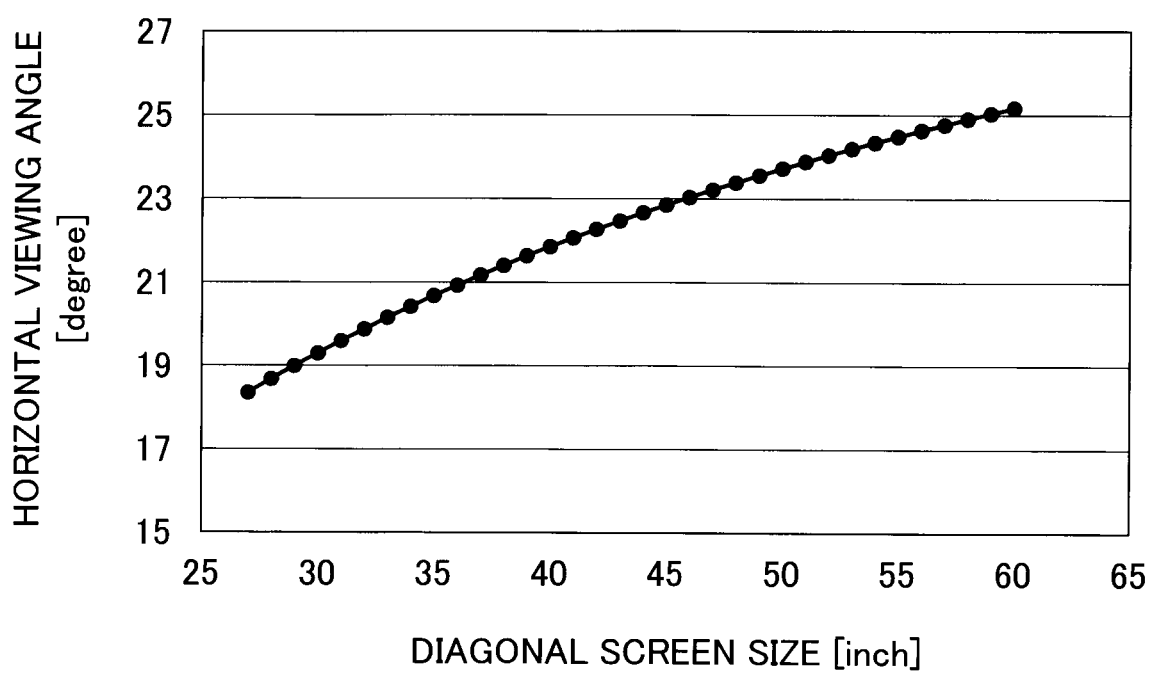

[Fig. 10]
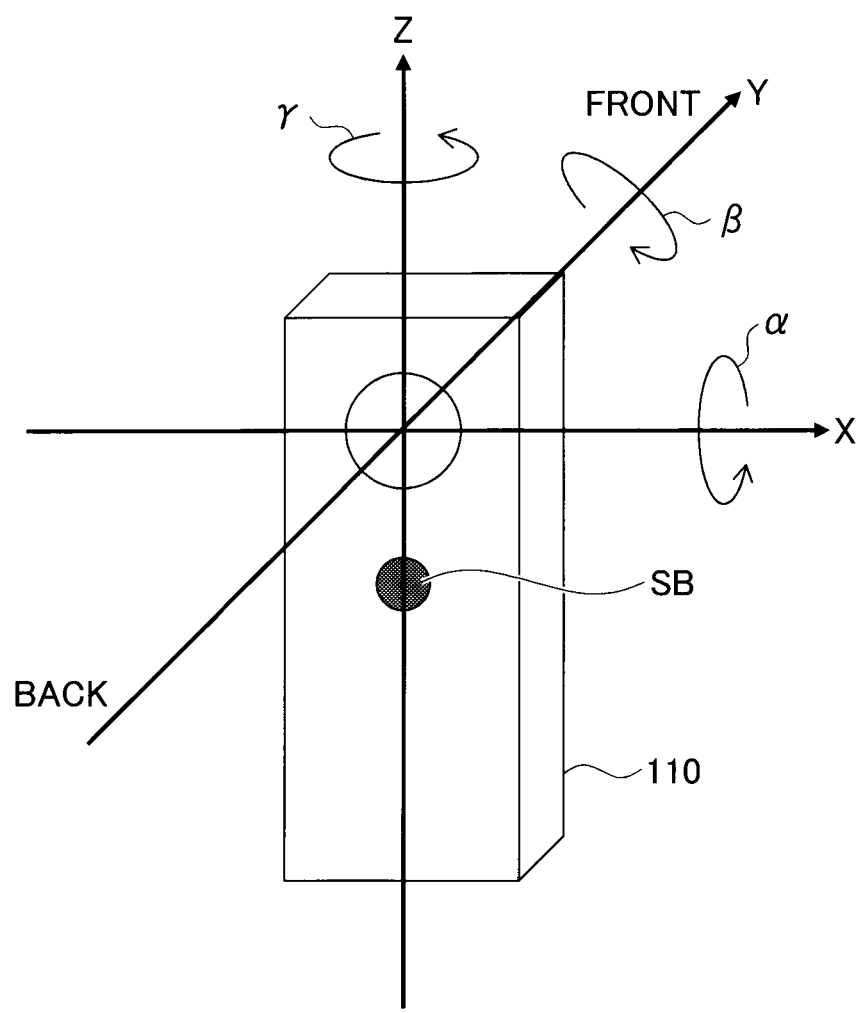

[Fig. 11]
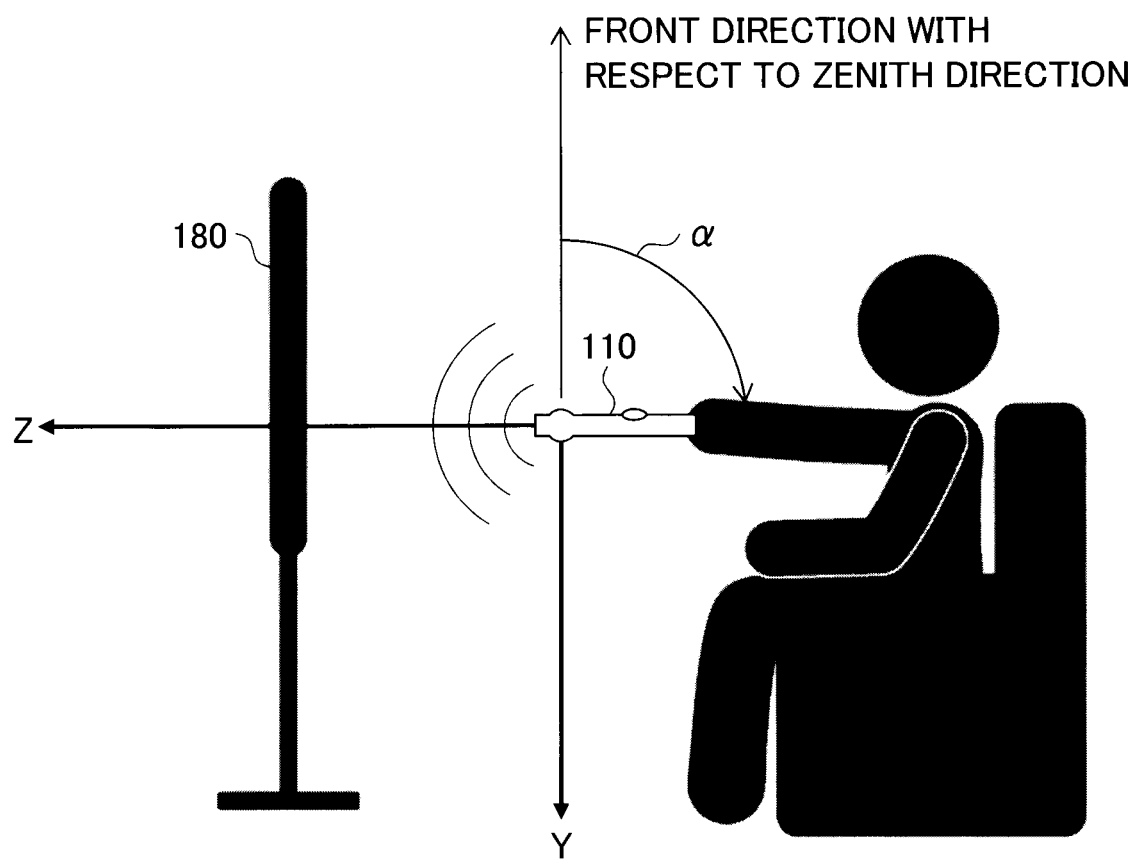

[Fig. 12]
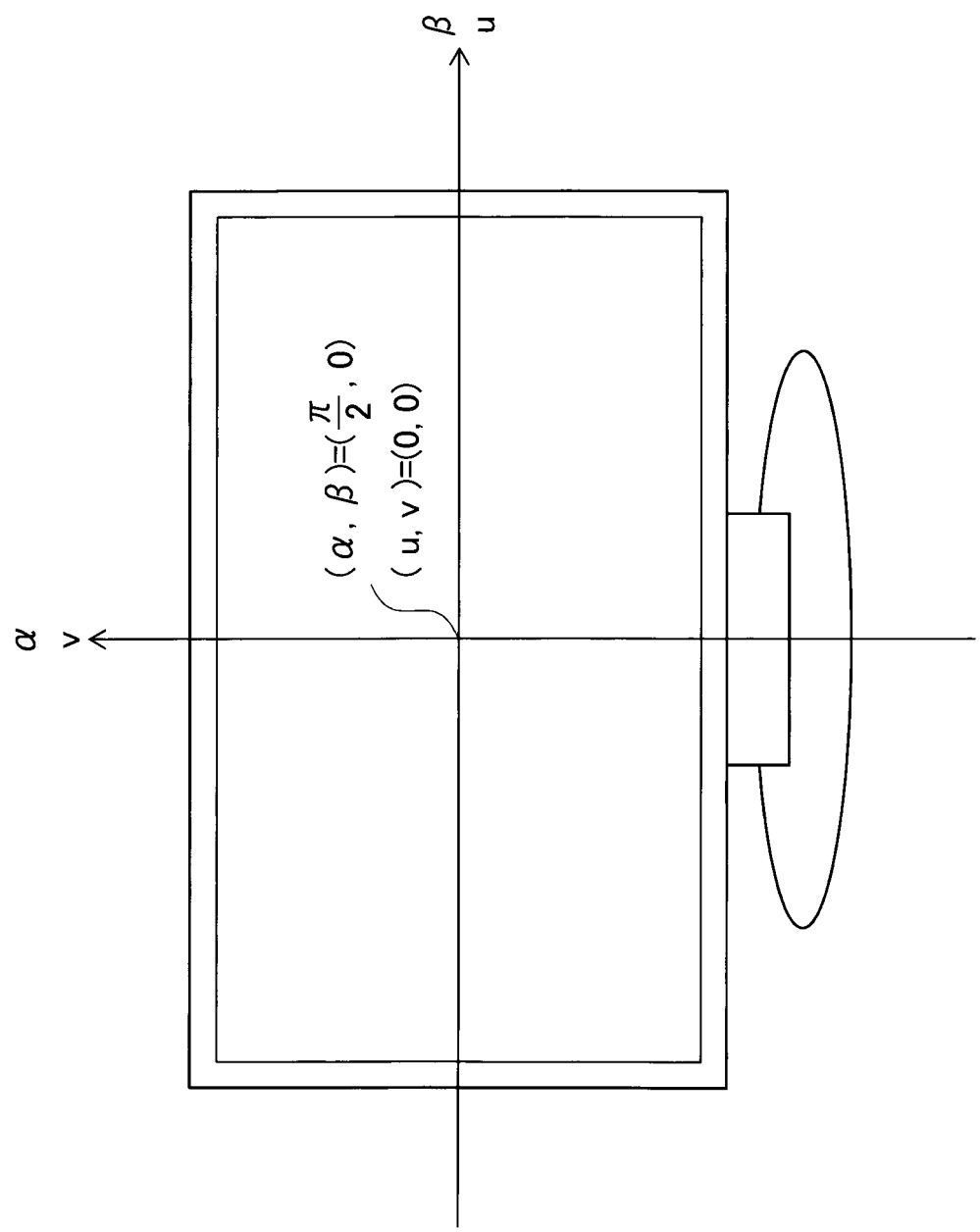

[Fig. 13A]
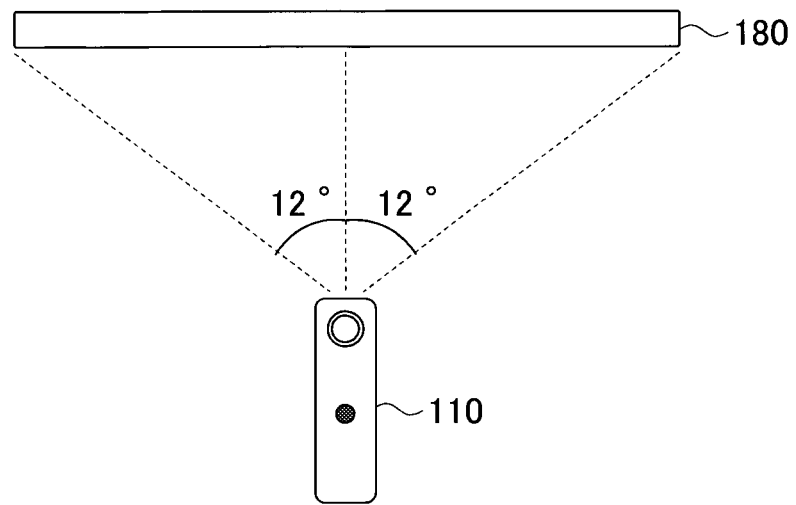
[Fig. 13B]
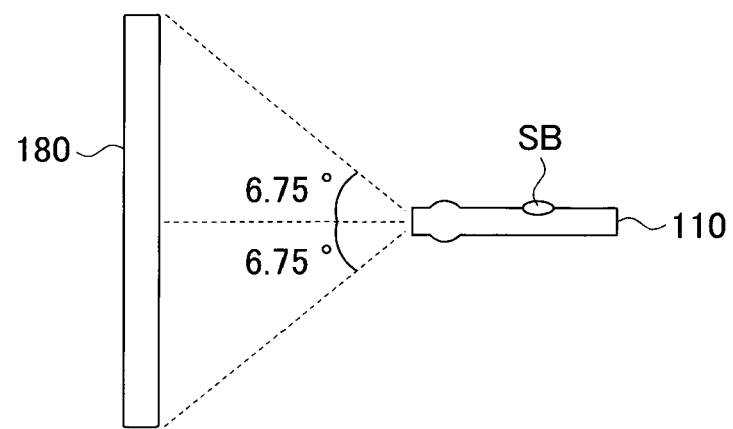

[Fig. 14]
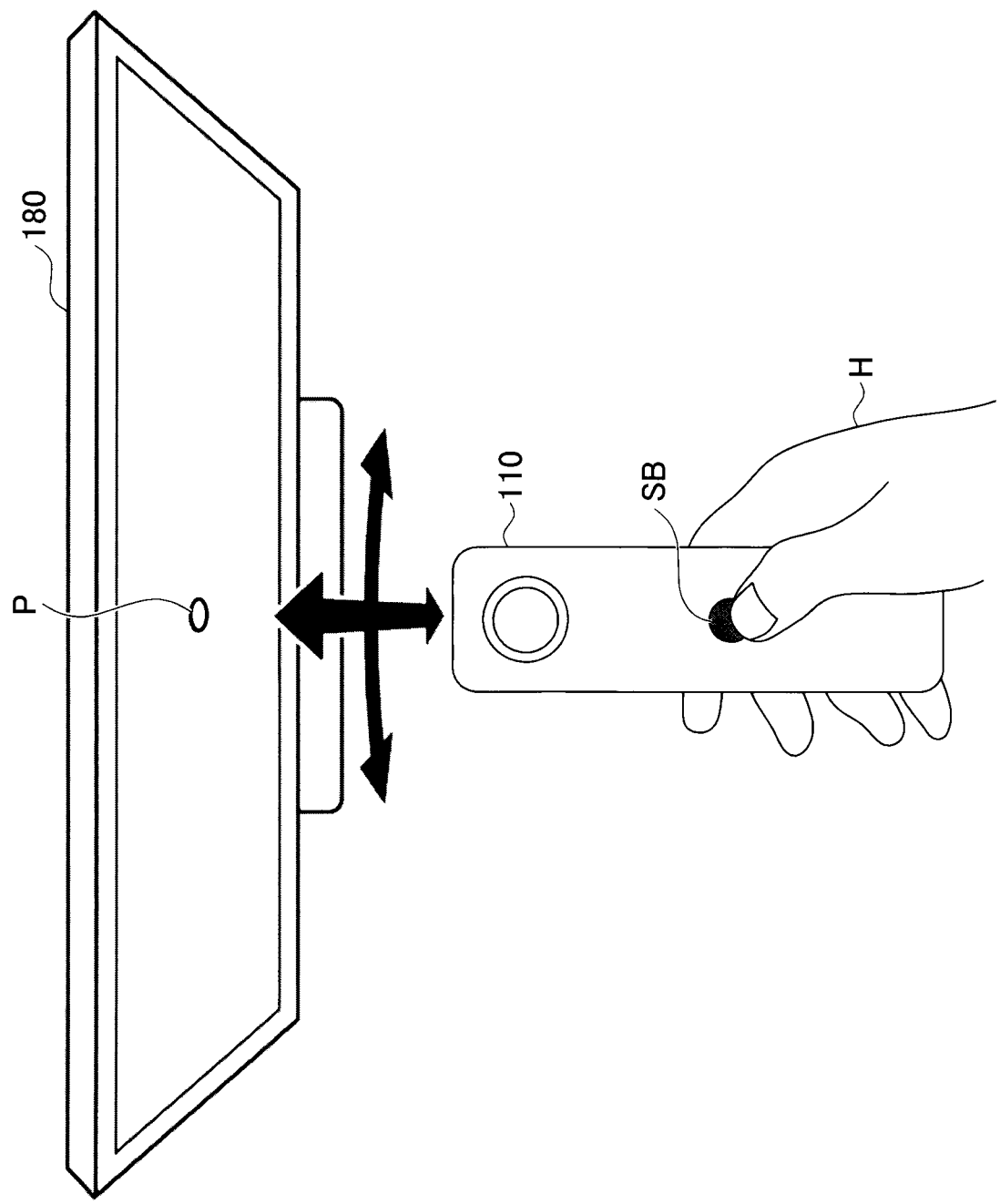

[Fig. 15]
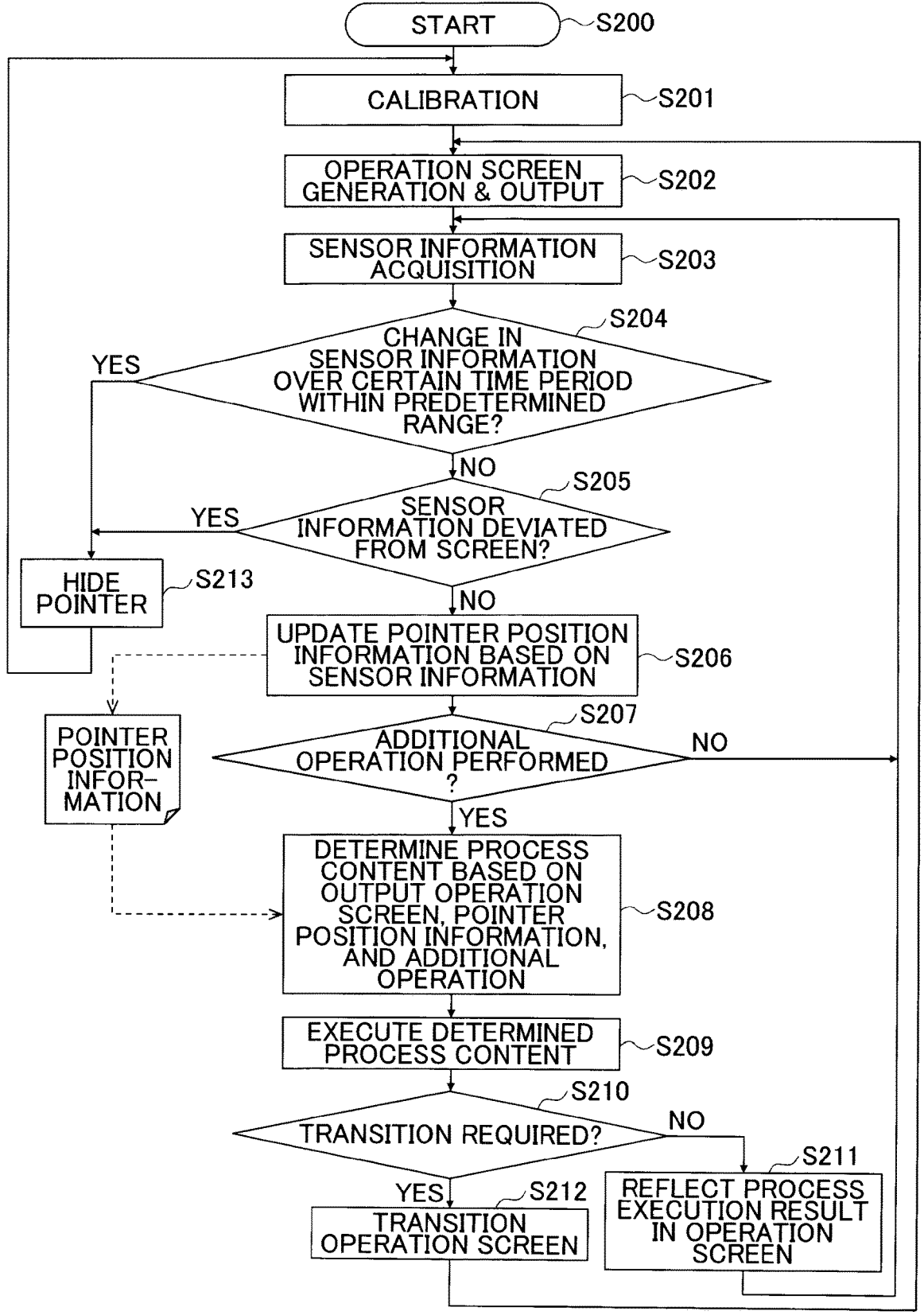

[Fig. 16]
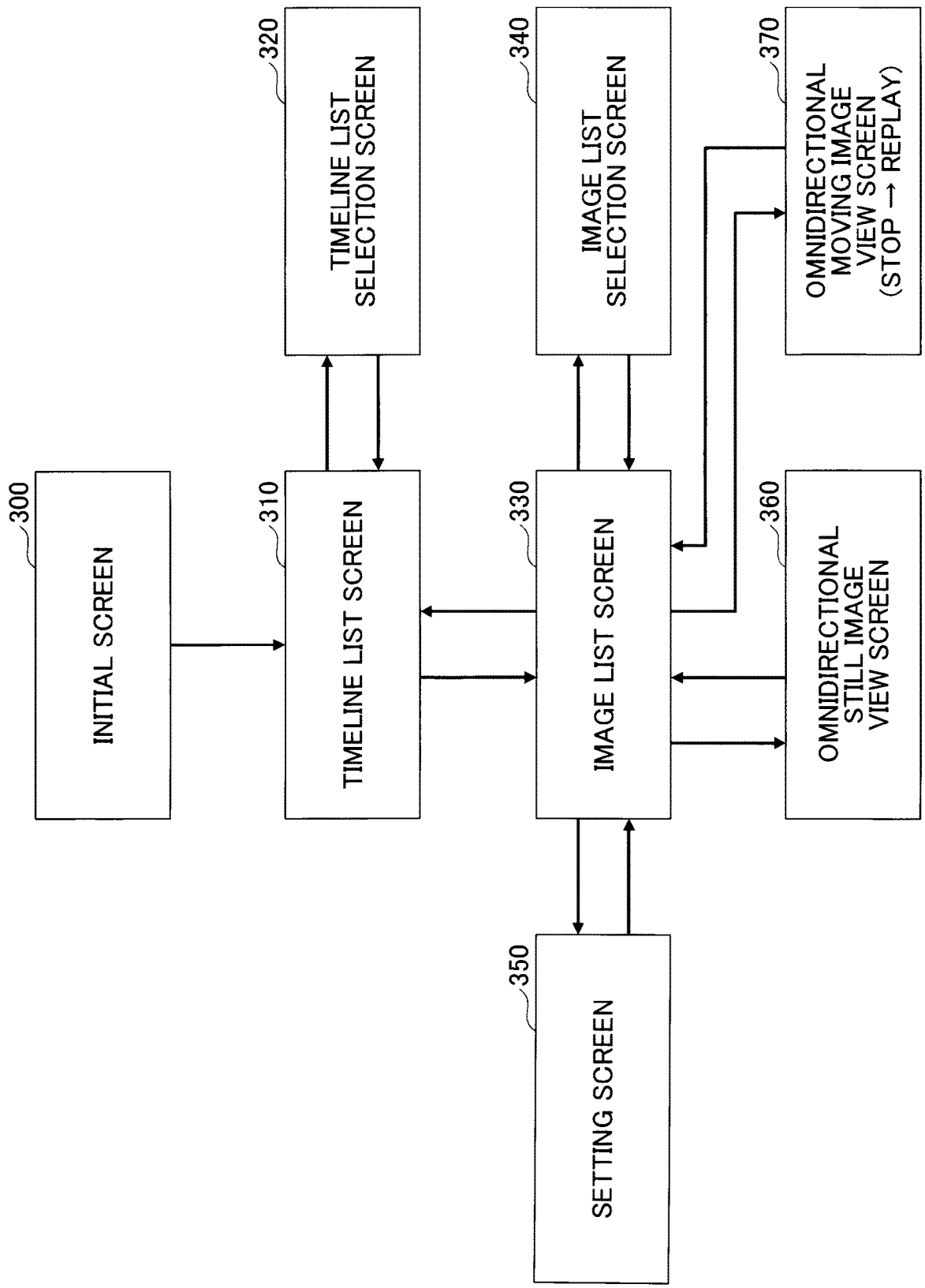

[Fig. 17A]
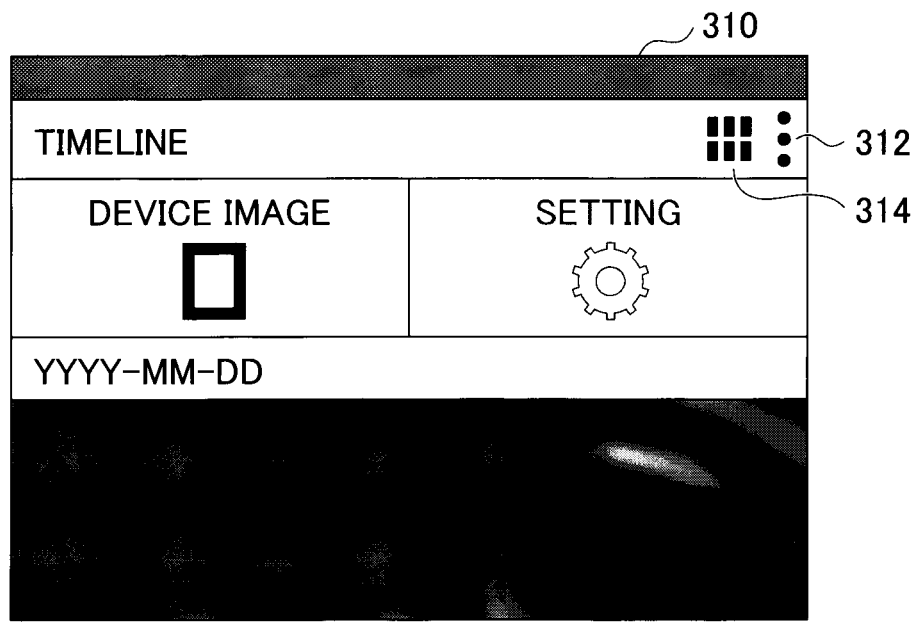
[Fig. 17B]
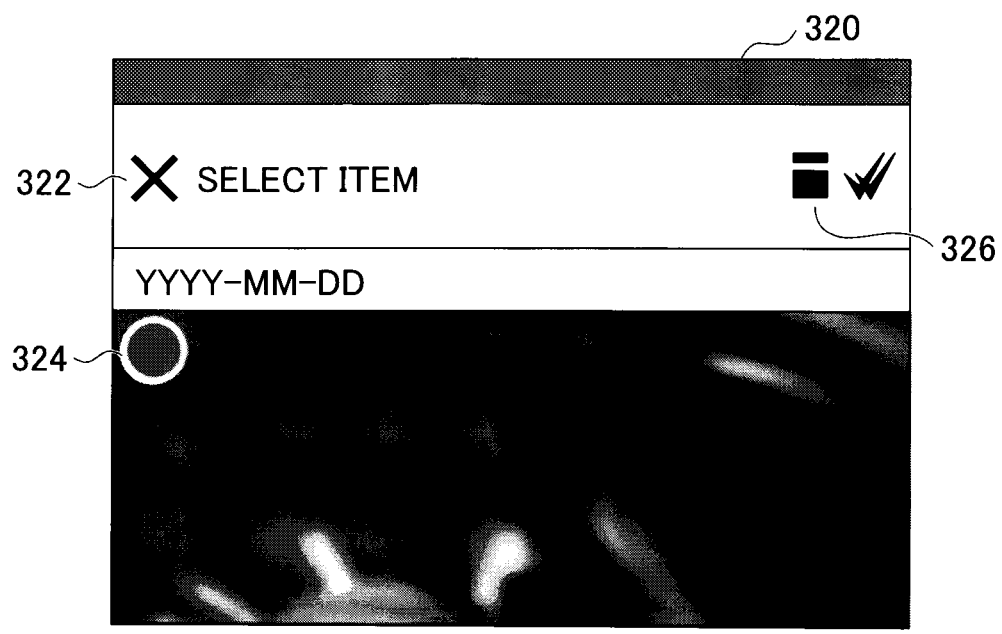

[Fig. 17C]
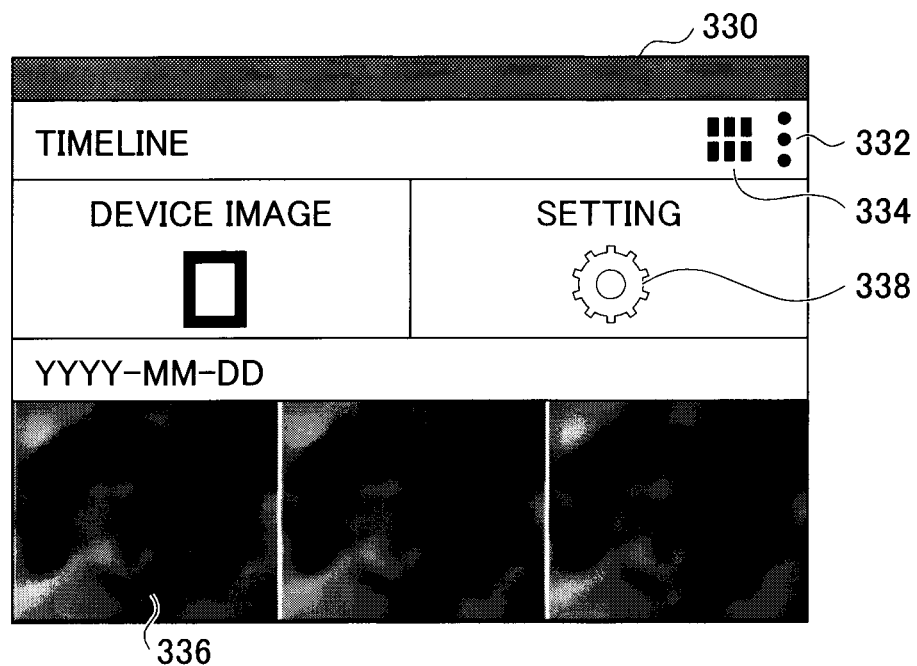
[Fig. 17D]
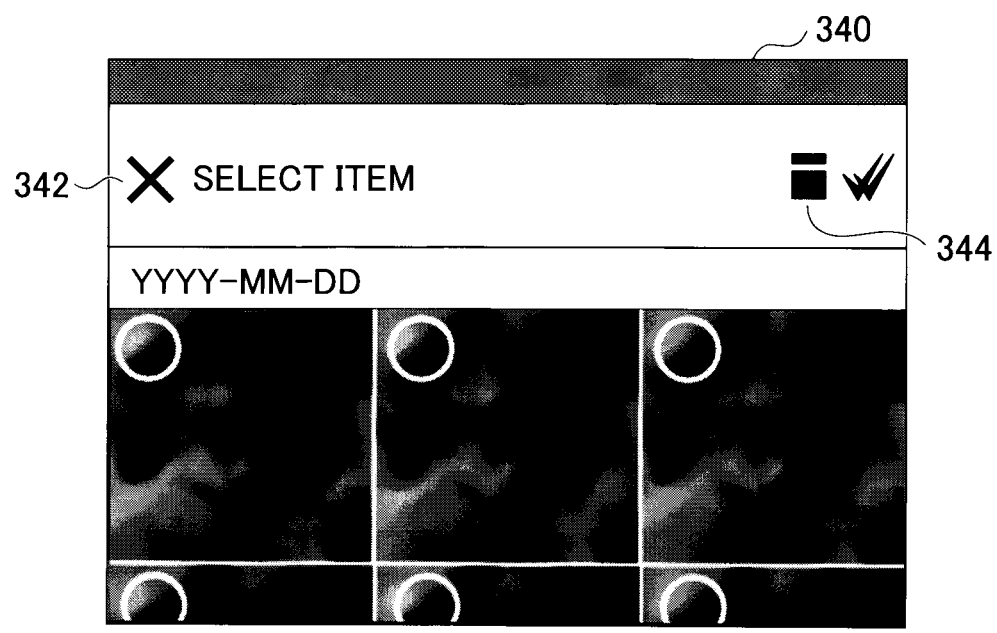

[Fig. 18A]
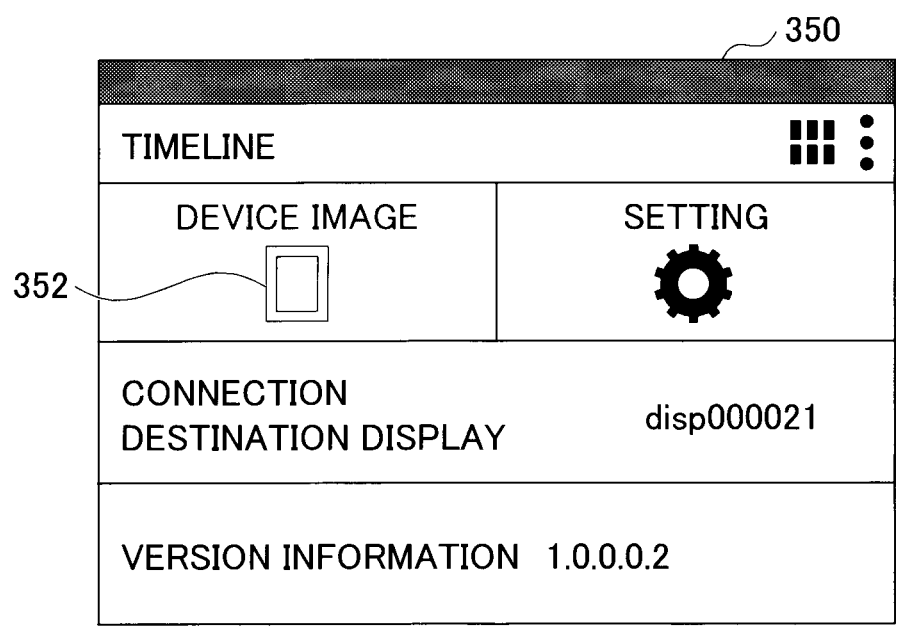
[Fig. 18B]
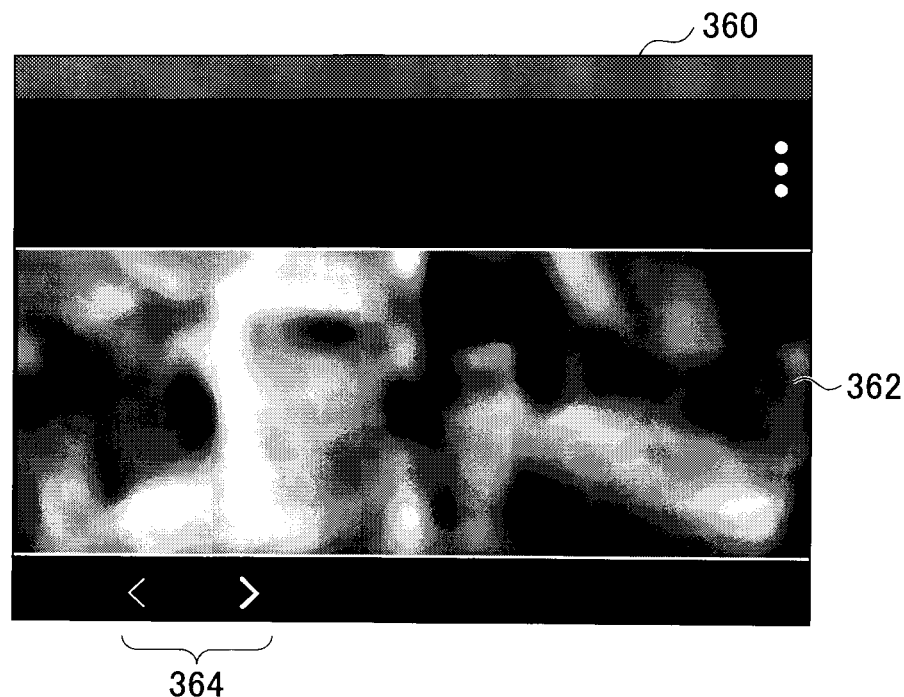

[Fig. 18C]
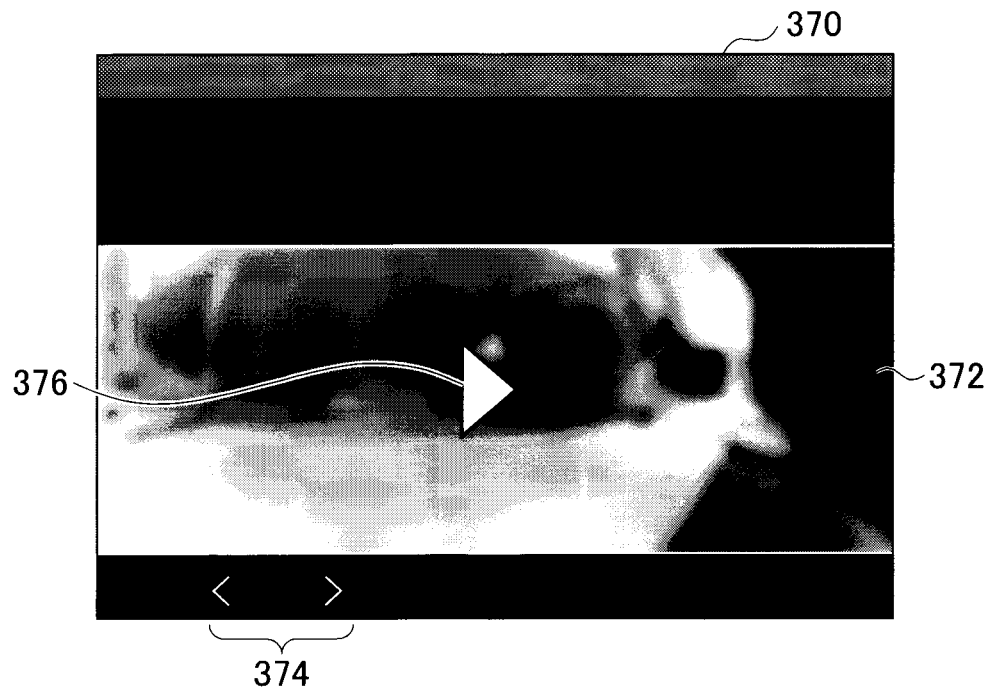
[Fig. 18D]
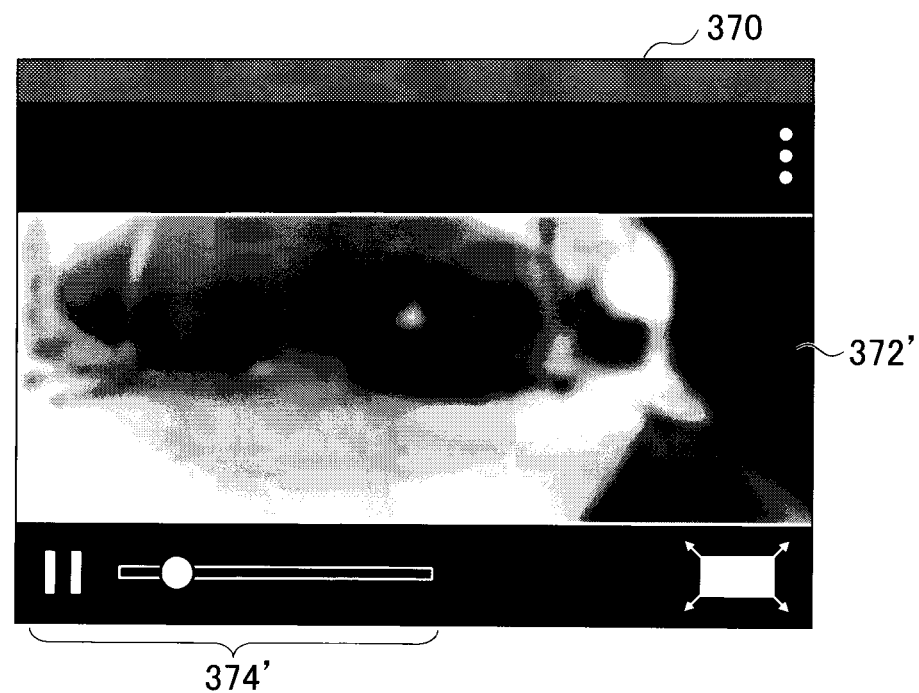

[Fig. 19]
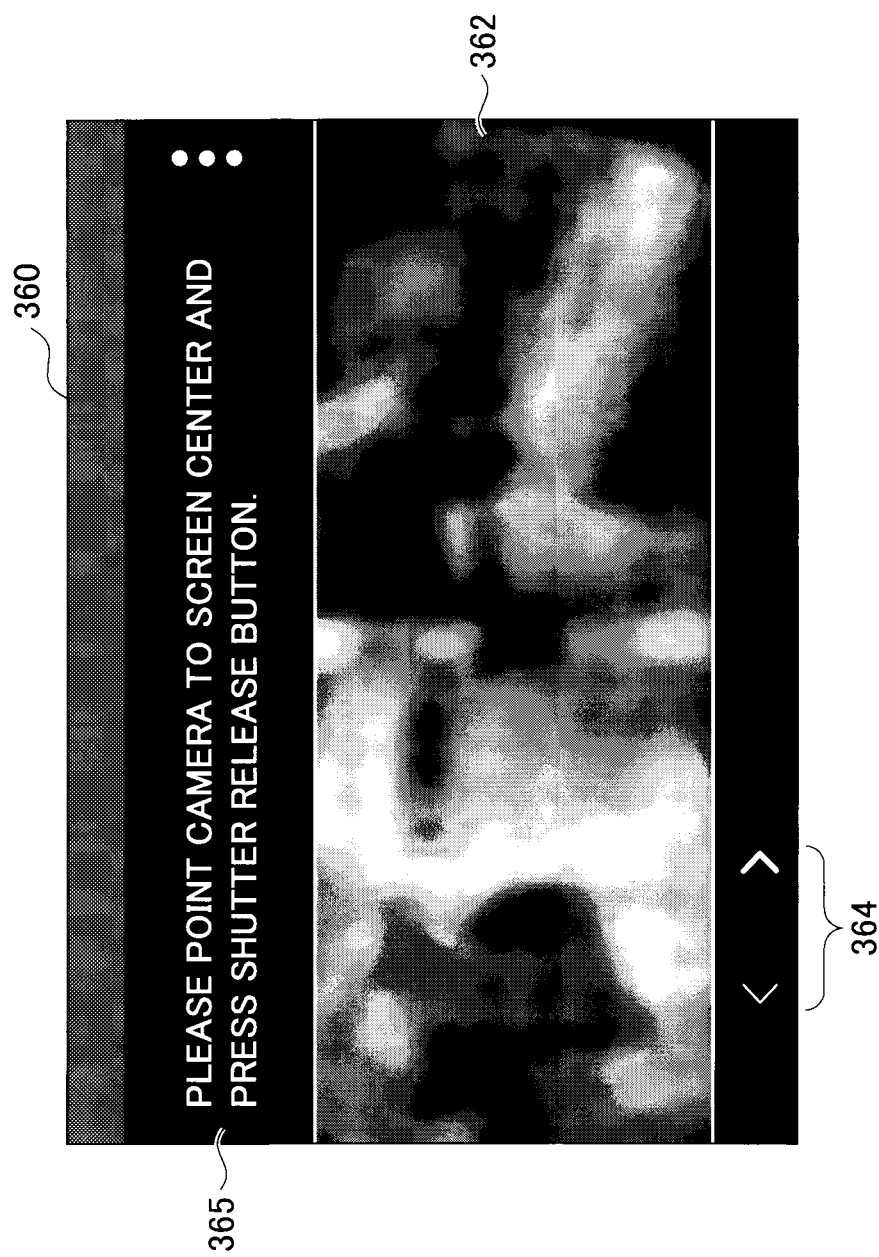

[Fig. 20]
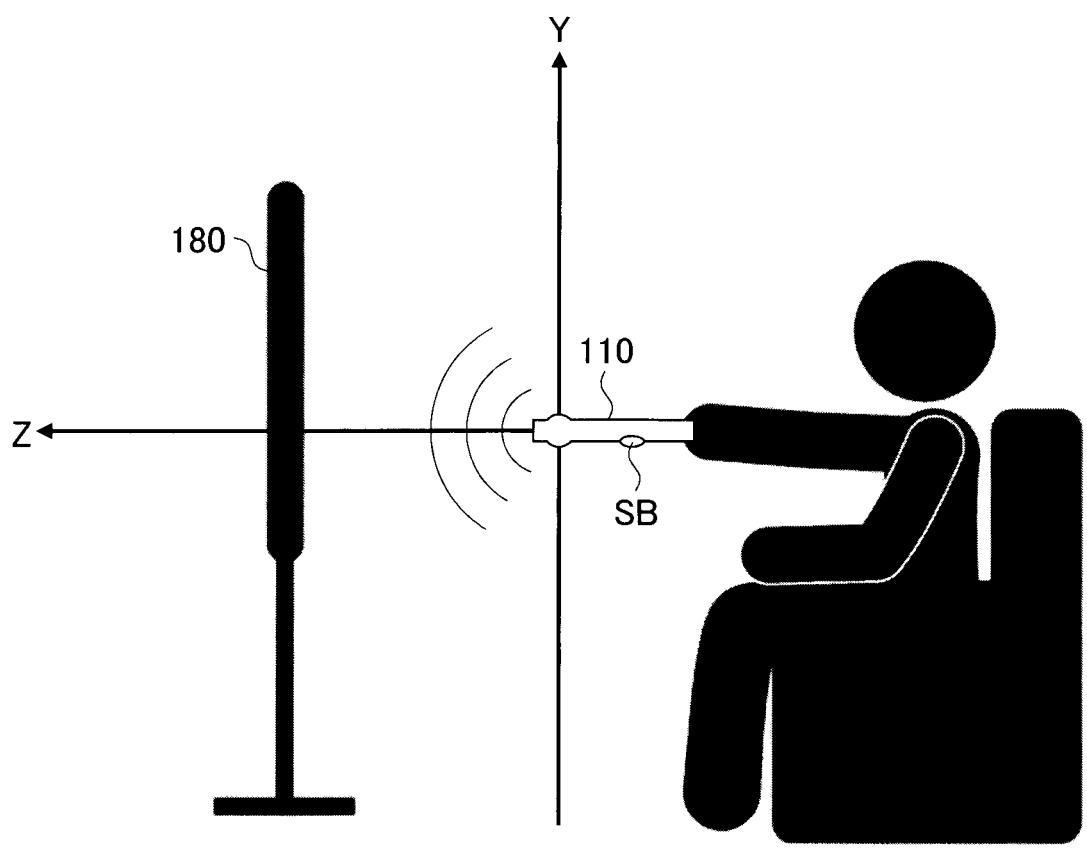

[Fig. 21]
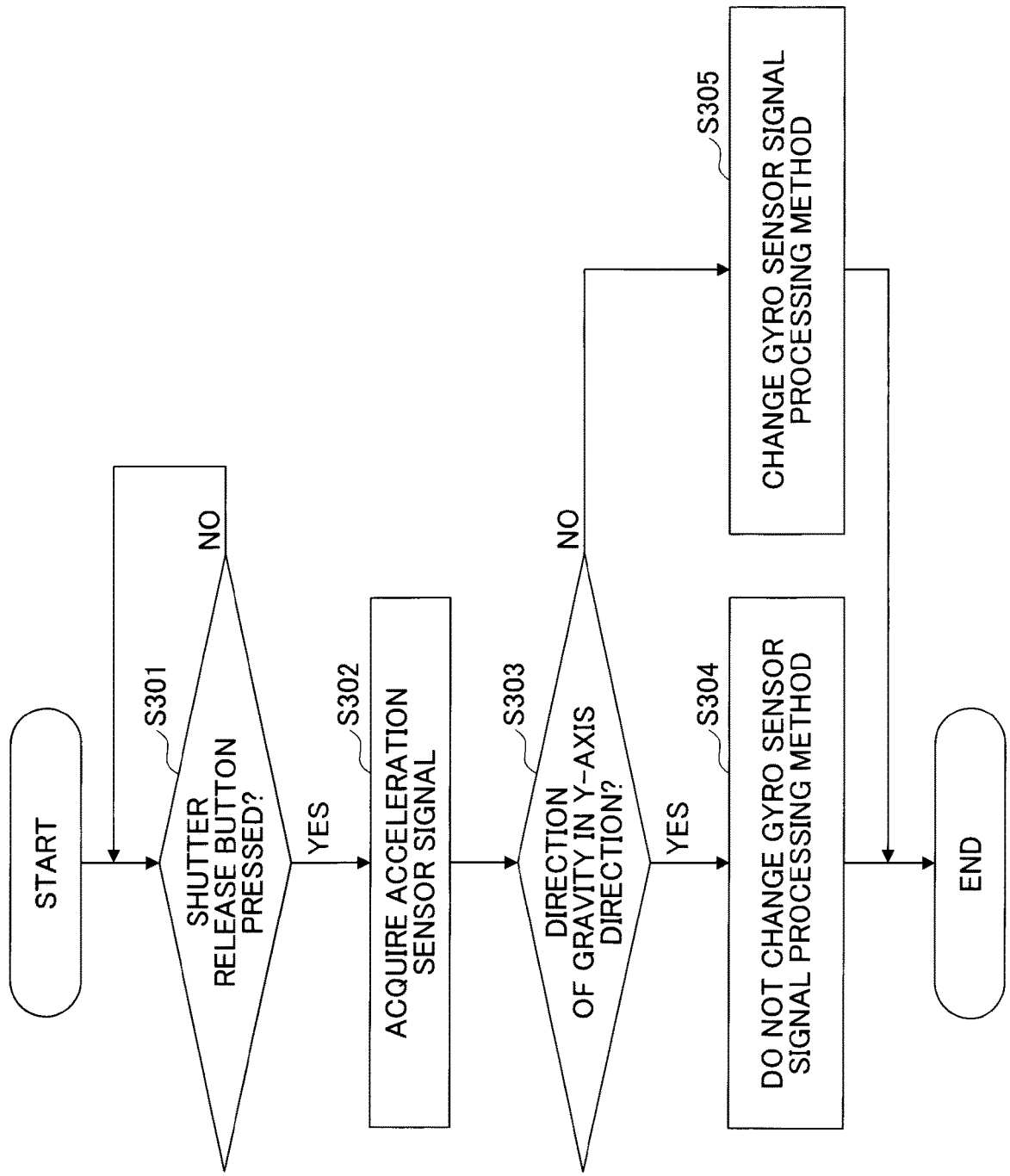

IMAGE CAPTURING APPARATUS, IMAGE DISPLAY SYSTEM, AND OPERATION METHOD

TECHNICAL FIELD

The present invention relates to an image capturing apparatus, image display system, and operation method.

BACKGROUND ART

Omnidirectional image capturing apparatuses that can capture 360-degree omnidirectional images by a single image capturing operation using a plurality of wide-angle lenses such as fisheye lenses and super-wide angle lenses are known. An image captured by such omnidirectional image capturing apparatus is transmitted to a display apparatus equipped with a display so that a user can view the image.

When an image is displayed by a display apparatus with a small display such as a smartphone or a tablet terminal, the user can directly operate a touch panel to input various operations directed to the image (e.g., selecting an image from a list, scrolling a screen to select an image to be displayed, determining a display range). On the other hand, there is a demand for viewing an image captured by an omnidirectional image capturing apparatus on a display apparatus with a large display such as a television apparatus. In response to such a demand, there are standards for wirelessly transmitting images, such as Miracast (registered trademark), Google Chrome (registered trademark), and Airplay (registered trademark), and by configuring the omnidirectional image capturing apparatus to support such standards, a user can easily view an image captured by the omnidirectional image capturing apparatus on a large screen.

However, in some cases, a display apparatus with a large display may not have a touch panel. Also, even if the display apparatus has a touch panel, it may be difficult for a user to view the image being displayed when the user approaches the display to operate the touch panel and operability may be compromised. To address such inconvenience, a pointing device may be used to perform operations on an image displayed on such display apparatus (see, e.g., Patent Document 1). Patent Document 1 discloses a mobile communication terminal that calculates a movement amount and a movement direction using movement detection result data of a mobile communication terminal and transmits the calculated values as operation instruction information to a display apparatus. The user can move a position display component such as a pointer pointing to a position on a screen by adjusting the attitude (orientation) of the pointing device. Also, an apparatus such as an image capturing apparatus corresponding to the sender of the image displayed on the display apparatus may be used as the pointing device so that the user can perform operations on the displayed image even when a separate pointing device is not provided.

CITATION LIST

Patent Literature

[PTL 1] Japanese Patent No. 4394742

Non Patent Literature

[NPL 1] Kubota, Satoru. (2012). "Ergonomic Design Guidelines for Flat Panel Display Televisions". Japan Ergonomics Society 53rd Conference.

SUMMARY OF INVENTION

Technical Problem

However, when an apparatus such as an image capturing apparatus corresponding to the sender of the displayed image (sender apparatus) is used as a pointing device, a discrepancy between the position of the position display component and the attitude of the sender apparatus becomes gradually larger due to the influence of sensor drift and the like. For example, when some menu button is being displayed, even if the user orients the sender apparatus with the intent to point the position display component to the menu button, the position display component may be displayed away from the menu button and operability may be compromised.

In view of the above problems, one aspect of the present invention is directed to providing a technique for preventing the occurrence of a discrepancy between the position of a position display component and the attitude of a sender apparatus such as an image capturing apparatus.

Solution to Problem

According to one embodiment of the present invention, an image capturing apparatus is provided that includes a storage unit configured to store a captured image, a generating unit configured to generate an operation screen relating to the captured image stored in the storage unit, an output unit configured to output the operation screen generated by the generating unit to a display apparatus, an attitude information acquiring unit configured to acquire attitude information relating to an attitude of the image capturing apparatus, a position display component managing unit configured to convert the attitude information acquired by the attitude information acquiring unit into position information relating to a position of a position display component on the operation screen and display the position display component on the operation screen based on the converted position information, and an operation accepting unit configured to accept an initialization operation of initializing the position of the position display component. The position display component managing unit displays the position display component at an initial position of the operation screen in response to the operation accepting unit accepting the initialization operation.

Advantageous Effects of Invention

According to one aspect of the present invention, the occurrence of a discrepancy between the position of a position display component and the attitude of a sender apparatus such as an image capturing apparatus may be prevented.

BRIEF DESCRIPTION OF DRAWINGS

FIG. 1A is a diagram illustrating an example operation of an omnidirectional image capturing apparatus according to an embodiment of the present invention.

FIG. 1B is a diagram illustrating another example operation of the omnidirectional image capturing apparatus.

FIG. 1C is a diagram illustrating another example operation of the omnidirectional image capturing apparatus.

FIG. 2 is a diagram illustrating an example schematic configuration of an omnidirectional image display system according to an embodiment of the present invention.

FIG. 3 is a block diagram illustrating an example hardware configuration of the omnidirectional image capturing apparatus.

FIG. 4 is a block diagram illustrating an example hardware configuration of a wireless communication apparatus.

FIG. 5 is a block diagram illustrating main functions associated with an operation screen providing function of an image viewer implemented in the omnidirectional image capturing apparatus.

FIG. 6 is a flowchart illustrating a connection method implemented by the omnidirectional image capturing apparatus for establishing connection with a counterpart wireless communication apparatus.

FIG. 7 is a side view of relative positions of the omnidirectional image capturing apparatus and a display apparatus as apprehended by a user.

FIG. 8 is a graph indicating the relationship between the diagonal screen size and the optimum viewing distance extracted from "Ergonomic Design Guidelines for Flat Panel Display Televisions".

FIG. 9A is a diagram illustrating a horizontal viewing angle of a display apparatus at an optimum viewing distance.

FIG. 9B is a graph indicating the relationship between the diagonal screen size and the horizontal viewing angle.

FIG. 10 is a diagram illustrating coordinate axes of the omnidirectional image capturing apparatus.

FIG. 11 is a diagram illustrating an attitude of the omnidirectional image capturing apparatus to be used as a reference.

FIG. 12 is a diagram illustrating the correspondence between the rotation angle of the omnidirectional image capturing apparatus and the coordinates of a pointer.

FIG. 13A is a diagram illustrating an operation of hiding the pointer.

FIG. 13B is another diagram illustrating the operation of hiding the pointer.

FIG. 14 is a diagram illustrating an example display of the pointer displayed in response to initialization of coordinates.

FIG. 15 is a flowchart illustrating a method implemented by the omnidirectional image capturing apparatus for displaying an image on an external display apparatus and accepting an operation.

FIG. 16 is a diagram illustrating example transitions of operation screens provided by the omnidirectional image capturing apparatus.

FIG. 17A is a diagram illustrating a timeline list screen as an example operation screen provided by the omnidirectional image capturing apparatus.

FIG. 17B is a diagram illustrating a timeline list selection screen as an example operation screen provided by the omnidirectional image capturing apparatus.

FIG. 17C is a diagram illustrating an image list screen as an example operation screen provided by the omnidirectional image capturing apparatus.

FIG. 17D is a diagram illustrating an image list selection screen as an example operation screen provided by the omnidirectional image capturing apparatus.

FIG. 18A is a diagram illustrating a setting screen as an example operation screen provided by the omnidirectional image capturing apparatus.

FIG. 18B is a diagram illustrating an omnidirectional still image view screen as an example operation screen provided by the omnidirectional image capturing apparatus.

FIG. 18C is a diagram illustrating an omnidirectional moving image view screen as an example operation screen provided by the omnidirectional image capturing apparatus.

FIG. 18D is a diagram illustrating the omnidirectional moving image view screen when an operation corresponding to pressing a replay button is accepted.

FIG. 19 is a diagram illustrating an example message displayed when a pointer is hidden to describe to a user a method of initializing coordinates of a pointer to be displayed on the operation screen.

FIG. 20 is a diagram illustrating coordinate axes in a case where the user holds the omnidirectional image capturing apparatus with a shutter release button facing downward.

FIG. 21 is a flowchart illustrating a process for changing a calculation method for calculating the orientation of the omnidirectional image capturing apparatus in the case where the user holds the omnidirectional image capturing apparatus with the shutter release button facing downward.

DESCRIPTION OF EMBODIMENTS

In the following, embodiments of the present invention will be described with reference to the accompanying drawings.

<Schematic Operations of Omnidirectional Image Capturing Apparatus>

FIGS. 1A-1C are diagrams illustrating schematic operations of an omnidirectional image capturing apparatus 110 according to an embodiment of the present invention. The omnidirectional image capturing apparatus 110 wirelessly transmits a captured image to a display apparatus 180. The display apparatus 180 displays the received image. As shown in FIG. 1A, the user can hold the omnidirectional image capturing apparatus 110 as a pointing device and perform desired operations such as selecting an image from a list, scrolling a screen to select an image to be displayed, or determining a display range, for example. However, because the omnidirectional image capturing apparatus 110 detects its attitude using a built-in gyro sensor, a discrepancy may occur between a direction indicated by a user using the omnidirectional image capturing apparatus 110 and the position of a pointer P due to the influence of sensor drift, for example. The term "drift" refers to the fluctuation of a zero point due to temperature (temperature rise or temperature decrease), for example.

In the omnidirectional image capturing apparatus 110 according to the present embodiment, a user who notices such a discrepancy can initialize the position of the pointer P. To perform such initialization, preferably, the pointer P is first hidden. As such, the user may perform one of the following operations, for example.

(i) Cause the pointer P to deviate from the screen of the display apparatus 180.

(ii) Perform an operation that is normally not performed (special operation).

(iii) Stop for a certain time period.

FIG. 1B illustrates an operation of turning the omnidirectional image capturing apparatus 110 sideways (left and right) to greatly change the orientation of the omnidirectional image capturing apparatus 110 to cause the pointer P to deviate from the screen of the display apparatus 180. Note that the operation to "stop for a certain time period" is not limited to being performed in response to noticing a discrepancy and may be performed naturally by the user viewing an image.

When the user performs any one of these operations, the omnidirectional image capturing apparatus 110 hides the pointer P. Note that the state of hiding or not displaying the pointer P may be referred to as "non-display".

In the non-display state, the user points the omnidirectional image capturing apparatus 110 to an initial position of the pointer P and presses a shutter release button SB. That is, the user points to the pointer P to be displayed at the initial position with the omnidirectional image capturing apparatus 110. In FIG. 1C, the center of the screen of the display apparatus 180 is the initial position of the pointer P. In this case, the direction indicated by the omnidirectional image capturing apparatus 110 and the position of the pointer P coincide. Thus, by performing such initialization process, the occurrence of a discrepancy between the position of the pointer P and the attitude of the omnidirectional image capturing apparatus 110 may be prevented.

<Terminology>

Information relating to an attitude of an image capturing apparatus refers to information that can specify, determine, or estimate the attitude of the image capturing apparatus. In the present embodiment, information detected by at least one of a gyro sensor, an acceleration sensor, and a geomagnetic sensor is an example of information relating to an attitude of an image capturing apparatus. Also, attitude may also be referred to as the orientation of an object and is expressed by three rotation angles: roll, pitch, and yaw.

A position display component refers to a display component indicating a position in an operation screen. The position display component may indicate a position in the operation screen at which a use operation is input, or point to an operation target such as a button or an icon. Further, the position display component may also be referred to as a pointer P, a cursor, a mouse cursor, a mouse pointer, and the like.

Initialization of the position of the position display component refers to displaying the pointer P at predetermined coordinates (origin) on the operation screen.

<Configuration>

FIG. 2 shows a schematic configuration of an omnidirectional image display system 100 according to the present embodiment. The omnidirectional image display system 100 includes the omnidirectional image capturing apparatus 110 that captures an omnidirectional image, a wireless communication apparatus 150 that communicates with the omnidirectional image capturing apparatus 110, and a display apparatus 180 that is connected to the wireless communication apparatus 150.

The omnidirectional image capturing apparatus 110 includes two imaging optical systems each including an imaging optical system and an imaging element, and generates a captured image by having each imaging optical system capture an image from all directions. The imaging optical system has a total angle of view greater than 180 degrees (=360 degrees/n; n=2), more preferably a total angle of view greater than or equal to 185 degrees, and more preferably a total angle of view greater than or equal to 190 degrees.

The omnidirectional image capturing apparatus 110 joins captured images captured by the plurality of imaging optical systems to synthesize an image covering a solid angle of 4π steradians (hereinafter referred to as "omnidirectional image"). Note that an omnidirectional image is an image capturing all directions viewable from an image capturing point.

The image captured by the omnidirectional image capturing apparatus 110 may be viewed using an external apparatus having a dedicated image viewer/application, for example. The external apparatus may be, for example, a personal computer, a smartphone, a tablet computer, or the like. The omnidirectional image capturing apparatus 110 according to the present embodiment also has an image viewer function for displaying a captured image on a display. Note, however, that there may be cases where the external apparatus used by the omnidirectional image capturing apparatus 110 does not have a display with a sufficient resolution for viewing the image, or where the user does not have an external apparatus, for example.

In this respect, the omnidirectional image capturing apparatus 110 according to the present embodiment has a wireless image communication function as an example of a communication apparatus, and the omnidirectional image capturing apparatus 110 uses the wireless communication function to wirelessly transmit an operation screen generated by an image view of the omnidirectional image capturing apparatus 110 to the display apparatus 180.

Note that a part of the data included in the operation screen (e.g., background screen) may be pre-stored in the omnidirectional image capturing apparatus 110. In this case, when the omnidirectional image capturing apparatus 110 and the display apparatus 180 start communication, the pre-stored data may be read out and the pointer P or the like may be superimposed on the pre-stored data to generate an operation screen, and the generated operation screen may then be transmitted to the display apparatus 180. Further, the pre-stored data may be stored in an external storage device that is wirelessly connected to the omnidirectional image capturing apparatus 110 via a wireless device and may be acquired therefrom, for example. Further, the pre-stored data may also be delivered from the wireless device via the Internet, for example.

The wireless communication apparatus 150 has a wireless image communication function and receives an operation screen generated by the image viewer of the omnidirectional image capturing apparatus 110. The wireless communication apparatus 150 outputs a video image of the operation screen to the display apparatus 180 that is connected to the wireless communication apparatus 150. The display apparatus 180 displays the image input by the wireless communication apparatus 150 on a display panel such as an LCD (Liquid Crystal Display) or an OLED (Organic Light Emitting Diode). Note that the wireless communication apparatus 150 can receive video, still images, moving images, sound, and the like from the omnidirectional image capturing apparatus 110 and output the received content to the display apparatus 180.

In FIG. 2, the omnidirectional image capturing apparatus 110 and the wireless communication apparatus 150 may be wirelessly connected by a wireless LAN (Local Area Network), for example. The connection between the communication apparatus 110 and the wireless communication apparatus 150 preferably conforms to a wireless video transmission standard such as Miracast (registered trademark), AirPlay (registered trademark), or Chromecast (registered trademark), for example.

The connection between the wireless communication apparatus 150 and the display apparatus 180 may be established using a video output interface such as HDMI (High-Definition Multimedia Interface, registered trademark), DisplayPort (registered trademark), or Thunderbolt (registered trademark), for example.

An image viewer operation screen S generated by the omnidirectional image capturing apparatus 110 is wirelessly transmitted as video to the wireless communication apparatus 150 and is output as video from the wireless communication apparatus 150 to the display apparatus 180 to be displayed on the display apparatus 180.

The image viewer operation screen S displayed on the display apparatus 180 is preferably configured such that it can be operated without additional hardware such as a mouse, a keyboard, another information terminal, or the like.

FIG. 2 also illustrates an operation mode of the omnidirectional image capturing apparatus 110 according to the present embodiment. In the present embodiment, the omnidirectional image capturing apparatus 110 can be held by the user's hand H as shown in FIG. 2. By holding the omnidirectional image capturing apparatus 110 with the hand H and moving the omnidirectional image capturing apparatus 110, the user can move the pointer P on the image viewer operation screen S displayed on the display apparatus 180. In this way, the user can perform various operations with respect to an image.

For example, the user may move the omnidirectional image capturing apparatus 110 upward or downward with respect to the display apparatus 180 to move the position of the pointer P on the operation screen S displayed on the display apparatus 180 upward or downward. Also, the user may swing the omnidirectional image capturing apparatus 110 to the left or to the right with respect to the display apparatus 180 to move the pointer P on the operation screen S in the left direction or the right direction. The user may move the pointer P to a predetermined position on the operation screen S and press a hardware operation component such as a hardware button provided at the casing of the omnidirectional image capturing apparatus 110 to instruct the omnidirectional image capturing apparatus 110 to execute a desired process.

As described above, in the omnidirectional image display system 100 according to the present embodiment, the image viewer operation screen S is transmitted from the omnidirectional image capturing apparatus 110 to the display apparatus 180 via the wireless communication apparatus 150. While viewing the operation screen S displayed on the display apparatus 180, the user physically moves the omnidirectional image capturing apparatus 110 to perform a desired operation on the operation screen.

<Hardware Configuration>
<<Omnidirectional Image Capturing Apparatus 110>>

The hardware configuration of the omnidirectional image capturing apparatus 110 will be described below with reference to FIG. 3. FIG. 3 is a block diagram illustrating an example hardware configuration of the omnidirectional image capturing apparatus 110 according to the present embodiment. Note that in FIG. 3, the omnidirectional image capturing apparatus 110 is configured as a twin lens omnidirectional image capturing apparatus that combines two optical systems each having a total angle of view greater than 180 degrees.

The omnidirectional image capturing apparatus 110 includes a CPU (Central Processing Unit) 112, a ROM (Read Only Memory) 114, an image processing block 116, a moving image block 118, a DRAM (Dynamic Random Access Memory) 132 connected via a DRAM interface 120, and an acceleration sensor/gyro sensor/geomagnetic sensor (at least one of an acceleration sensor, a gyro sensor, and a geomagnetic sensor) 136 connected via an external sensor interface 124.

The CPU 112 controls the operations of various units and the overall operation of the omnidirectional image capturing apparatus 110. The ROM 114 stores control programs and various parameters described by codes decodable by the CPU 112.

The omnidirectional image capturing apparatus 110 includes first and second imaging elements 130A and 130B, which may be CCD (Charge Coupled Device) sensors or CMOS (Complementary Metal Oxide Semiconductor) sensors, and first and second optical systems 131A and 131B. In the present embodiment, the optical systems 131A and 131B include fisheye lenses. Note that in the present description, a fisheye lens includes a so-called wide-angle lens or a super wide-angle lens. The image processing block 116 is connected to the first and second imaging elements 130A and 130B such that image signals of images captured by the first and second imaging elements 130A and 130B are input to the image processing block 16. The image processing block 116 may include an ISP (Image Signal Processor), for example, and performs image processing such as shading correction, Bayer interpolation, white balance correction, gamma correction, and the like on the image signals input from the first and second imaging elements 130A and 130B.

In the present embodiment, the image processing block 16 performs an image synthesis process with respect to the images captured by the first and second imaging elements 130A and 130B using an overlapping portion as a reference, and in this way, an omnidirectional image covering a solid angle of 4π steradians is generated. Because the first and second optical systems 131A and 131B each have a total angle of view exceeding 180 degrees, captured ranges of the captured images exceeding 180 degrees overlap. During the image synthesis process, the overlapping portion is referred to as reference data representing the same image to generate an omnidirectional image. Further, consecutive frames of the omnidirectional image can be combined to constitute an omnidirectional moving image.

In the present embodiment described below, it is assumed that an omnidirectional image capturing all directions viewable from an image capturing point is generated. However, in other embodiments, a so-called panoramic image with a horizontal plane covering a 360° image capturing range may be generated, for example. Further, in the present embodiment, an omnidirectional image capturing apparatus including two imaging optical systems is described as an example. However, the number of imaging optical systems is not particularly limited. In other embodiments, the omnidirectional image capturing apparatus 110 may have an image capturing mechanism implemented by three or more optical systems including three or more fisheye lenses and a function of generating an omnidirectional image based on a plurality of captured images captured by the three or more optical systems. In yet another embodiment, the omnidirectional image capturing apparatus 110 may include an image capturing mechanism implemented by a single fisheye lens as an optical system and a function of generating an omnidirectional image based on a plurality of captured images captured at different azimuths by the single fisheye lens, for example.

The moving image block 118 is a codec block for compressing and decompressing moving images based on Moving Picture Experts Group (MPEG)-4 AVC (Advanced Video Coding)/H.264 or H.265, for example. The DRAM 132 provides a storage area for temporarily storing data when various signal processing and image processing are performed. The acceleration sensor/gyro sensor/geomagnetic sensor 136 measures a physical quantity, such as velocity, acceleration, angular velocity, angular acceleration, magnetic orientation or the like, caused by movement of the omnidirectional image capturing apparatus 110. The measured physical quantity can be used for applying the zenith correction on an omnidirectional image and for determining a process content of a process with respect to an image viewer operation screen.

The omnidirectional image capturing apparatus 110 further includes an external storage interface 122. An external storage 134 is connected to the external storage interface 122. The external storage interface 122 controls reading and writing operations with respect to the external storage 134, which may be a memory card inserted in a memory card slot or some other type of external storage device.

The omnidirectional image capturing apparatus 110 further includes a USB (Universal Serial Bus) interface 126. A USB connector 138 is connected to the USB interface 126. The USB interface 126 controls USB communication with an external apparatus such as a personal computer, a smartphone, or a tablet computer that is connected via the USB connector 138.

The omnidirectional image capturing apparatus 110 further includes a serial block 128. The serial block 128 controls serial communication with an external apparatus and has a wireless communication interface 140 connected thereto. In the present embodiment, the omnidirectional image capturing apparatus 110 is connected to an external apparatus such as the wireless communication apparatus 150 by a wireless video transmission protocol, such as Miracast (registered trademark), using the wireless communication interface 140. In this way, an operation screen of the omnidirectional image capturing apparatus 110 can be displayed on a display of the external apparatus or on a connected display.

Note that the omnidirectional image capturing apparatus 110 may also be connected to an external apparatus such as an external personal computer, a smartphone, a tablet computer or the like via the USB connector 138 or the wireless communication interface 140 to display video on a display of the external apparatus or on a connected display, for example. In addition to the configuration illustrated in FIG. 3, the omnidirectional image capturing apparatus 110 may have a video output interface such as HDMI (registered trademark). In such case, the omnidirectional image capturing apparatus 110 may be directly connected to an external display such as the display apparatus 180 or the like via the video output interface to display video on the external display.

When the power is turned on by a power switching operation, a control program is loaded from the ROM 114 or the like into a main memory. Based on the program loaded into the main memory, the CPU 112 controls the operation of various units of the omnidirectional image capturing apparatus 110 and temporarily stores data necessary for control in the memory. In this way, the various functional units and processes of the omnidirectional image capturing apparatus 110 relating to the operation screen providing function of the image viewer may be implemented.

<<Wireless Communication Apparatus as Example Communication Apparatus>>

FIG. 4 is a block diagram illustrating an example hardware configuration of the wireless communication apparatus 150 according to the present embodiment. The wireless communication apparatus 150 includes a CPU 152, a ROM 154, a RAM 156, a moving image block 158, a wireless communication interface 160, and a video output interface 162.

The CPU 152 controls the operations of various units and the overall operation of the wireless communication apparatus 150. The ROM 154 stores control programs and various parameters described by codes decodable by the CPU 152. The RAM 156 provides a storage area for temporarily storing data when performing various signal processing and image processing. The moving image block 158 is a codec block for compressing and decompressing moving images based on Moving Picture Experts Group (MPEG)-4 AVC (Advanced Video Coding)/H.264 or H.265, for example.

The wireless communication interface 160 controls wireless communication with external apparatuses such as the omnidirectional image capturing apparatus 110. In the present embodiment, the wireless communication apparatus 150 is connected to an external apparatus such as the omnidirectional image capturing apparatus 110 based on a wireless video transmission standard such as Miracast (registered trademark) using the wireless communication interface 160 and receives images transmitted from the external apparatus. The video output interface 162 is a video output interface such as HDMI (registered trademark). The wireless communication apparatus 150 may be directly connected to the external display apparatus 180 via the video output interface 162 to display video on the external display apparatus 180.

When the power is turned on, a control program is loaded from the ROM 154 or the like into the RAM 156. Based on the program loaded into the RAM 156, the CPU 152 controls the operations of various units of the wireless communication apparatus 150 and temporarily stores data necessary for control in the RAM 156. In this way, functional units and processes of the wireless communication apparatus 150 as described below may be implemented.

<Function>

In the following, an operation screen providing function of the image viewer included in the omnidirectional image capturing apparatus 110 according to the present embodiment will be described.

FIG. 5 is a block diagram illustrating main functions related to the operation screen providing function of the image viewer implemented in the omnidirectional image capturing apparatus 110 according to the present embodiment. FIG. 5 also illustrates functional blocks of the wireless communication apparatus 150.

In FIG. 5, the omnidirectional image capturing apparatus 110 includes a captured image storage unit 212, a sensor measuring unit 214, a wireless video transmitting unit 216, and an operation screen control unit 220.

The captured image storage unit 212 stores images captured by the first and second optical systems 131A and 131B of the omnidirectional image capturing apparatus 110. The captured image storage unit 212 may typically be implemented as a storage area of ??the external storage 134. The captured image storage unit 212 is an example of a storage unit according to the present embodiment.

The image stored in the captured image storage unit 212 may be fisheye images respectively captured via the first and second optical systems 131A and 131B, a dual fisheye image obtained by joining these two fisheye images, or an omnidirectional image obtained by synthesizing the two fisheye images based on a projection method such as the eccentric cylinder projection method or the like. The image stored in the captured image storage unit 212 may be a still image or a moving image, and the resolution of the moving image or the still image may be 2K, 4K, or any other resolution. The format of the still image may be any image format such as the JPEG format, the GIF format, the PNG format, the bitmap format, or the like. The format of the moving image may be any moving image format such as the MPEG 4 format, the H.264 format, the H.265 format, or the like.

Further, the moving image may include audio data of one channel or multiple channels (3D sound). When the angle of view is limited, two or more channels are preferable, when the horizontal viewing angle is greater than 180 degrees, three or more channels are preferable, and when there is an omnidirectional image, four channels are preferable. Note that because the sound volume may be different for each sound data, the omnidirectional image capturing apparatus 110 preferably has a function of manipulating the sound volume of a moving image. By enabling volume change by automatic volume adjustment or operation of the omnidirectional image capturing apparatus 110 without changing the sound volume setting of the display apparatus 180, usability may be improved, for example. Further, with respect to 3D sound data, the display apparatus 180 may not necessarily support 3D sound, and as such, a process of converting 3D sound into a 2-channel or 1-channel sound at the time of replay may be performed by the omnidirectional image capturing apparatus 110 or the wireless communication apparatus 150, for example.

The sensor measuring unit 214 uses the acceleration sensor/gyro sensor/geomagnetic sensor 136 illustrated in FIG. 3 to measure a physical quantity associated with movement of the omnidirectional image capturing apparatus 110. Examples of the physical quantity measured by the sensor measuring unit 214 include a speed, an acceleration, an angular velocity, an angular acceleration, a magnetic orientation, and any combinations thereof that quantify at least one of a position change, an attitude change, and a rotation of the omnidirectional image capturing apparatus 110. The sensor measuring unit 214 is an example of a measuring unit according to an embodiment of the present invention.

The combination of sensors used by the sensor measuring unit 214 is not particularly limited. For example, when a gyro sensor is included in the omnidirectional image capturing apparatus 110, the sensor measuring unit 214 can detect a movement of the omnidirectional image capturing apparatus 110 using the gyro sensor. This gyro sensor is not particularly limited but may be a three-axis sensor or a six-axis sensor, for example. Also, an acceleration sensor, a geomagnetic sensor, or a combination thereof may be used in addition to or in place of a gyro sensor, for example. By combining a plurality of sensors, movement of the omnidirectional image capturing apparatus 110 may be detected without fixing the orientation of the omnidirectional image capturing apparatus 110. Note that if a magnetic sensor being used is unstable, further filtering can be applied. Because an acceleration sensor can detect the tilt (pitch and roll) of the omnidirectional image capturing apparatus 110, a measurement made by a gyro sensor can be corrected based on the detected tilt. Even when a gyro sensor or some other sensor is used alone, for example, smoothing may still be performed using a median filter, a low pass filter, a high pass filter, a band pass filter, or a combination thereof, for example.

The operation screen control unit 220 controls generation of an operation screen relating to the image viewer function of the omnidirectional image capturing apparatus 110 and transition of operation screens. The operation screen control unit 220 may be implemented as a function of firmware of the omnidirectional image capturing apparatus 110 or may be implemented by an extended application to be added onto the firmware. For example, the operation screen control unit 220 may be activated in response to a specific operation such as the extended pressing of a specific hardware button provided at the casing of the omnidirectional image capturing apparatus 110, or in response to the omnidirectional image capturing apparatus 110 establishing connection with the wireless communication apparatus 150.

As shown in FIG. 5, the operation screen control unit 220 includes a screen output processing unit 222 responsible for output processing of an operation screen, a screen input processing unit 224 responsible for input processing of an operation screen, and a process executing unit 230 for executing a process that is requested via an operation screen.

The screen output processing unit 222 generates an operation screen to be currently displayed, and outputs the generated operation screen. The screen output processing unit 222 can generate various types of operation screens such as an image list screen that lists one or a plurality of captured images stored in the captured image storage unit 212, an image view screen that displays a specific image selected from among the images listed in the image list screen, a setting screen, and the like. Note that specific types of operation screens and a specific manner of transitioning from one operation screen to another will be described below with reference to FIGS. 17A-17D, 18A-18D, and 19.

The screen input processing unit 224 determines the process content of an operation on a currently output operation screen relating to a captured image that is intended by the user based on a physical quantity measured by the sensor measuring unit 214. More specifically, the screen input processing unit 224 includes a pointer position managing unit 226, a process content determining unit 228, and a non-display determining unit 229.

Based on the physical quantity measured by the sensor measuring unit 214, the pointer position managing unit 226 manages the position of the pointer P, which is an example of a pointing unit pointing to an object on the operation screen currently being displayed. For example, the pointer position managing unit 226 may use the detection result of the geomagnetic sensor 136 to detect the moving direction, attitude direction, and orientation of the omnidirectional image capturing apparatus 110 and convert the detected information into pointer P movement information. In the present embodiment, the pointer P is described as an example of the pointing unit. However, in other embodiments, focus on specific controls on the operation screen may be used, for example. In this case, the focus selection state may be managed.

Also, the pointer position managing unit 226 hides the pointer P when the non-display determining unit 229 determines that a predetermined condition has been satisfied. Further, the pointer position managing unit 226 initializes the coordinates of the pointer P when the shutter release button SB is pressed while the pointer P is hidden.

Note that detection of two-dimensional movement in the vertical (up and down) and lateral (left and right) directions with respect to a plane environment may be sufficient when selecting a menu, for example. In this case, although not particularly limited, because it is intuitively easy to understand movement with respect to plane coordinates facing the display device (positional relationship parallel to display screen), calibration may be performed using an initial position and an initial attitude. In the case of detecting three-dimensional movement including a depth direction (front and back), detection of the amount of movement in the front-back direction may be associated with a separate operation. For example, a movement of pressing forward may be detected as an operation corresponding to pressing a selected control. In this way, the pointer P on the operation screen can be moved laterally or vertically by moving the omnidirectional image capturing apparatus 110 laterally or vertically with respect to the ground surface irrespective of how the omnidirectional image capturing apparatus 110 is oriented. Also, in some embodiments, certain restrictions may be imposed on the way the omnidirectional image capturing apparatus 110 should be held by the user (orientation of the omnidirectional image capturing apparatus 110) by designating a button position such as the shutter release button SB side as the upper side, for example.

The process content determining unit 228 determines a process content of an operation on the operation screen based on the position of the pointer P on the operation screen and any additional operation performed with respect to the omnidirectional image capturing apparatus 110 as necessary. The additional operation may be an operation based on an input accepted by a hardware button provided at the casing of the omnidirectional image capturing apparatus 110, for example. A plurality of controls such as buttons and icons each associated with a predetermined process content are displayed on the operation screen. When an additional operation is performed while one of the controls is selected by the pointer P, the predetermined process content associated with the selected control is determined by the process content determining unit 228.

The non-display determining unit 229 determines whether to hide the pointer P based on the physical quantity measured by the sensor measuring unit 214. More specifically, the non-display determining unit 229 determines that the pointer P should be hidden when the a change in the physical quantity measured by the sensor measuring unit 214 is no more than a predetermined value (within a predetermined range) over at least a predetermined time period, or when the physical quantity measured by the sensor measuring unit 214 indicates that the pointer P has deviated from the screen of the display apparatus 180.

The process executing unit 230 executes the process content specified by the process content determining unit 228. The process content may include calling a predetermined operation screen, various operations relating to image display, and various operations relating to image editing, for example.

More specifically, the process content may include displaying a still image on the operation screen, hiding a still image, starting replay of a moving image, pausing replay of a moving image, fast forwarding a moving image, rewinding a moving image, stopping replay of a moving image, rotating a still image or a moving image, enlarging the display range of a still image or a moving image, reducing the display range of a still image or a moving image, moving a view point of a still image or a moving image, and the like. Further, the process content may include selecting an image, deleting an image, converting the image format of an image, extracting a still image from a moving image, converting the resolution of an image, dividing a moving image, and changing a replay volume for a moving image. Note that converting the image format of an image may include converting a dual fisheye image into an omnidirectional image, for example.

The wireless video transmitting unit 216 uses the wireless communication interface 140 illustrated in FIG. 3 to wirelessly transmit an operation screen reflecting the result of processing executed by the process executing unit 230 to an external apparatus as video.

The wireless communication apparatus 150 is connected to the display apparatus 180. The wireless communication apparatus 150 causes the display apparatus 180 to display the operation screen transmitted by the wireless video transmitting unit 216 of the omnidirectional image capturing apparatus 110. In the present embodiment, the wireless communication apparatus 150 is externally connected to the display apparatus 180. However, the present invention is not limited thereto, and in some embodiments, the wireless communication apparatus 150 may include the display apparatus 180, for example.

Also, in some cases, the omnidirectional image capturing apparatus 110 may not have a display with a sufficient resolution, or may not have a display. Thus, when performing device registration for enabling the omnidirectional image capturing apparatus 110 to establish connection with the wireless communication apparatus 150, the user may be required to perform complicated operations.

In this respect, in a preferred embodiment, the wireless communication apparatus 150 may further include a self information transmitting unit 252. In the preferred embodiment, the wireless video transmitting unit 216 of the omnidirectional image capturing apparatus 110 may include a search processing unit 218.

In response to a device registration start operation such as the user pressing a predetermined button, the self information transmitting unit 252 changes a device name such as the SSID of the wireless communication apparatus 150 to a special name for a certain period of time and transmits the special name. The special name can be distinguished from a normal name assigned to the wireless communication apparatus 150 when device registration is not started and includes a specific character string pattern indicating that it is in device registration mode. For example, when the normal device name is "display001", a character string "_ON" may be added to obtain a special device name "display001_ON".

On the other hand, in order to start wireless communication with the wireless communication apparatus 150 on the display apparatus 180 side, the search processing unit 218 of the omnidirectional image capturing apparatus 110 performs a character string search to search for a wireless communication apparatus having a special name as a connection counterpart candidate. Note that the method of searching for a connection counterpart candidate is not limited to the above. For example, a wireless communication apparatus having a pre-registered MAC (Media Access Control) address may be searched for as a connection counterpart candidate, or a wireless communication apparatus that is first found may be considered a connection counterpart candidate. Also, in some embodiments, one of the above search methods may be designated in determining a connection counterpart, and in other embodiments, a plurality of search methods may be used and priorities may be assigned to the respective search methods in advance such that when a plurality of connection counterpart candidates are found, a connection counterpart candidate with the highest priority from among the connection counterpart candidates that have been found may be determined as the connection counterpart, for example.

<Connection Process>

FIG. 6 is a flowchart illustrating a connection method implemented by the omnidirectional image capturing apparatus 110 for establishing connection with the wireless communication apparatus 150 as the connection counterpart. The process of FIG. 6 is started in step S100, for example, in response to a specific operation such as the extended pressing of a specific hardware button provided at the casing of the omnidirectional image capturing apparatus 110. In FIG. 6, a connection method for establishing wireless communication will be described as an example, but wireless communication is merely one example of communication connection.

In step S101, the omnidirectional image capturing apparatus 110 validates an operation screen providing function of the image viewer. In step S102, the omnidirectional image capturing apparatus 110 causes the process to branch based on a search mode setting. The search mode setting may be set to a default search mode, or a desired search mode may be set up by the user.

If it is determined in step S102 that a search mode based on a MAC address (MAC address-based) is valid, the process proceeds to step S103. In step S103, the omnidirectional image capturing apparatus 110 has the search processing unit 218 search for a wireless communication apparatus corresponding to a preregistered MAC address as a connection counterpart candidate and proceeds to step S106 after completing the search.

On the other hand, if it is determined in step S102 that a search mode based on a special name (device name-based) is valid, the process proceeds to step S104. In the step S104, the omnidirectional image capturing apparatus 110 has the search processing unit 218 search for a wireless communication apparatus with a device name including a predetermined character string pattern as a connection counterpart candidate and proceeds to step S106 after completing the search. Note that if a hardware button of the wireless communication apparatus 150 for starting device registration is pressed and the device name of the wireless communication apparatus 150 has been changed to a special name, the wireless communication apparatus 150 will be found by the above search.

On the other hand, if it is determined in step S102 that a search mode based on chronological order (chronological order-based) is valid, the process proceeds to step S105. In step S105, the omnidirectional image capturing apparatus 110 searches for a wireless communication apparatus on the network and considers the first wireless communication apparatus found as a connection counterpart candidate after which it proceeds to step S106.

Note that the processes of steps S103 to S105 are selectively performed based on the search mode setting that is set up in advance. Note that in some embodiments, a plurality of the above processes may be performed in parallel or in succession. For example, if all search modes are valid, the processes of steps S103 to S105 may all be performed in parallel or in succession.

In step S106, the omnidirectional image capturing apparatus 110 determines whether at least one connection counterpart candidate has been found by the search conducted in step S103 to step S105. If it is determined in step S106 that at least one wireless communication apparatus as a connection counterpart candidate has been found (YES in step S106), the process proceeds to step S107.

In step S107, the omnidirectional image capturing apparatus 110 starts communication with the wireless communication apparatus having the highest priority from among the wireless communication apparatuses found. Note that priorities are assigned to search modes in order to determine a connection counterpart candidate having the highest priority in a case where a plurality of connection counterpart candidates are found as a result of executing a plurality of searches from among the MAC address-based search, the device name-based search, and the chronological order-based search. When only one search mode is designated, the designated mode is assigned the highest priority.

After step S108, an operation screen is displayed on the display apparatus 180, and an operation on the operation screen using the omnidirectional image capturing apparatus 110 is started.

On the other hand, if it is determined in step S106 that no connection counterpart candidate has been found (NO in step S106), the process proceeds to step S109. In step S109, the omnidirectional image capturing apparatus 110 invalidates the operation screen providing function, and ends the present process in step S110. At this time, a notification that no wireless communication apparatus as a connection counterpart candidate was found may be issued from a lamp or a speaker of the omnidirectional image capturing apparatus 110, for example.

Note that once connection is established, information on the connection status and other connectable devices can be displayed on the display apparatus 180. As such, the connection counterpart may be switched via the operation screen displayed on the display apparatus 180, for example. Also, note that there may be a plurality of wireless communication apparatuses having their hardware buttons for device registration pressed, and in such case, Bluetooth (registered trademark) communication or the like may be used to determine the first connection target, for example.

<Attitude of Omnidirectional Image Capturing Apparatus and Position of Pointer>

In the present embodiment, the position on the operation screen at which the omnidirectional image capturing apparatus 110 is to display the pointer P is determined based on how much the user has tilted the omnidirectional image capturing apparatus 110 (in the lateral and vertical directions). In order to enable the user to move the pointer P on the operation screen based on the attitude of the omnidirectional image capturing apparatus 110, the distance between the display apparatus 180 and the omnidirectional image capturing apparatus 110 and the screen size of the display apparatus 180 have to be taken into consideration. This is because the amount of movement of the pointer P on the screen of the display apparatus 180 with respect to a change in the orientation of the omnidirectional image capturing apparatus 110 varies depending on the distance between the display apparatus 180 and the omnidirectional image capturing apparatus 110. Also, the movable range of the pointer P varies depending on the screen size.

FIG. 7 is an example side view of the relative positions of the omnidirectional image capturing apparatus 110 held by the user and the display apparatus 180. The linear distance between the user and the display apparatus 180 is referred to as viewing distance L1. The viewing distance L1 may be either the distance between the user's head and the display apparatus 180, or the distance between the omnidirectional image capturing apparatus 110 and the display apparatus 180. In the present embodiment, because the position of the pointer P is controlled based on the attitude of the omnidirectional image capturing apparatus 110, the distance between the omnidirectional image capturing apparatus 110 and display apparatus 180 is preferably used as the viewing distance L1. Note however, that in some embodiments, the distance between the user's head and the display apparatus 180 or the average of the above two distances (i.e., the distance between the user's head and the display apparatus 180, and the distance between the omnidirectional image capturing apparatus 110 and display apparatus 180) may be used as the viewing distance.

In the following the optimum viewing distance will be described with reference to FIG. 8. FIG. 8 is a graph indicating the relationship between the diagonal screen size and the optimum viewing distance extracted from "Ergonomic Design Guidelines for Flat Panel Display Televisions" published by the Japan Ergonomics Society (see page 20). Assuming the display apparatus 180 is an ordinary household television, the diagonal screen size of most display apparatuses 180 may fall within a range from 27 to 60 inches. It can be appreciated from FIG. 8 that the optimum viewing distance in this case is 175 to 300 cm.

Note that the optimum viewing distance shown in FIG. 8 is the result of a preference study of 27 subjects, and the optimum viewing distance has individual differences. As a measure of such individual differences, widths of ±1 standard deviation are indicated in FIG. 8. Accordingly, the optimum viewing distance of 175 to 300 cm is merely one example used for explanatory purposes. For example, the viewing distance that is within ±1 standard deviation may be used as the optimum viewing distance.

By subdividing the horizontal axis representing the diagonal screen size from 27 to 60 inches and the vertical axis representing the viewing distance from 175 to 300 cm by subdividing points of predetermined intervals, the horizontal viewing angle of the display apparatus 180 at the respective subdividing points may be calculated.

FIGS. 9A and 9B are diagrams for explaining the horizontal viewing angle of the display apparatus 180 at the optimum viewing distance. FIG. 9A is a diagram illustrating the calculation of the horizontal viewing angle, and FIG. 9B is a graph indicating the relationship between the diagonal screen size and the horizontal viewing angle. Assuming the display apparatus 180 is a television apparatus provided in a family living room, the diagonal screen size of the display apparatus 180 may be about 49 to 55 inches. In this case, the horizontal viewing angle of the display apparatus 180 at a suitable viewing distance (see, e.g., "Ergonomic Design Guidelines for Flat Panel Display Televisions") is about 24 degrees. As can be appreciated, when the diagonal screen size of the display apparatus 180 is determined, the approximate horizontal viewing angle of the display apparatus 180 can be determined. For example, a default setting for the horizontal viewing angle may be set to about 23 to 24 degrees.

Under such an assumption, the omnidirectional image capturing apparatus 110 can convert the attitude of the omnidirectional image capturing apparatus 110 into coordinates of the pointer P. That is, when the user rotates the omnidirectional image capturing apparatus 110 horizontally by 24 degrees, the pointer P may move from the left edge of the screen to reach the right edge of the screen.

Note that a setting screen or the like is preferably prepared so that the user can input the diagonal screen size of the display apparatus 180 the user is using in the omnidirectional image capturing apparatus 110. In this case, the omnidirectional image capturing apparatus 110 may further accept an input of the viewing distance, for example. By configuring the omnidirectional image capturing apparatus 110 to accept inputs of the diagonal screen size and the viewing distance, the horizontal viewing angle of the display apparatus 180 may be more accurately determined.

Also, assuming the aspect ratio of the screen is 9:16, the vertical viewing angle in the vertical direction will be 13.5 degrees. When the user rotates the omnidirectional image capturing apparatus 110 vertically by 13.5 degrees, the pointer P moves from the upper edge of the screen to reach the lower edge of the screen.

In the following, coordinate axes of the omnidirectional image capturing apparatus 110 and coordinate of the pointer P will be described with reference to FIGS. 10 to 12. FIG. 10 is a diagram illustrating example coordinate axes of the omnidirectional image capturing apparatus 110, and FIG. 11 is a diagram the attitude of the omnidirectional image capturing apparatus 110 to be used as a reference. The attitude of the omnidirectional image capturing apparatus 110 to be used as a reference corresponds to an initial attitude of the omnidirectional image capturing apparatus 110 when coordinates of the pointer P are initialized.

In FIG. 10, the Z-axis represents the longitudinal direction of the omnidirectional image capturing apparatus 110, the Y-axis represents the depth direction passing through the two lenses of the omnidirectional image capturing apparatus 110 from a surface with the shutter release button SB toward an opposite surface without the shutter release button SB, and the X-axis represents the width direction of the omnidirectional image capturing apparatus 110. Note that the above axes of the omnidirectional image capturing apparatus 110 move along with the movement of the omnidirectional image capturing apparatus 110. The omnidirectional image capturing apparatus 110 can rotate about the X-axis, the Y-axis, and the Z-axis, respectively. The rotation angle around the X-axis is denoted as $\alpha$, the rotation angle around the Y-axis is denoted as $\beta$, and the rotation angle around the Z axis is denoted as $\gamma$.

As shown in FIG. 11, when the user operates the pointer P displayed on the display apparatus 180, the zenith direction is pointed toward the display apparatus 180. Because the rotation angle of each axis will be 90 degrees when the axis is in an upright position, the initial attitude of the omnidirectional image capturing apparatus 110 at the time of initializing the coordinates of the pointer P is: $\alpha=90$ degrees, $\beta=0$ degrees, and $\gamma=0$ degrees. The initial attitude corresponds to the attitude of the omnidirectional image capturing apparatus 110 when the pointer P is displayed at an initial position. As such, the initial attitude can be regarded as the reference attitude to be used as a reference for determining the attitude of the omnidirectional image capturing apparatus 110.

The omnidirectional image capturing apparatus 110 accepts an operation of initializing the coordinates of the pointer P any time irrespective of the actual attitude of the omnidirectional image capturing apparatus 110. That is, when the user performs a predetermined operation, the coordinates of the pointer P are initialized. The predetermined operation may be pressing the shutter release button SB, for example.

FIG. 12 is a diagram illustrating a correspondence between the rotation angle of the omnidirectional image capturing apparatus 110 and the coordinates of the pointer P. FIG. 12 illustrates an example case where the user presses the shutter release button SB while holding the omnidirectional image capturing apparatus 110 to be oriented in the initial attitude. The omnidirectional image capturing apparatus 110 displays the pointer P at the center (origin) of the screen. Assuming u represents the horizontal direction of the coordinates of the pointer P and v represent the vertical direction of the coordinates of the pointer P, the coordinates (u, v) of the pointer P is (0, 0) when the omnidirectional image capturing apparatus 110 is in the initial attitude. Assuming the user holding the omnidirectional image capturing apparatus 110 in the initial attitude is facing toward the front of the display apparatus 180, by displaying the pointer P at the center of the screen, the user can move the pointer P evenly throughout the entire range of the screen by changing the orientation of the omnidirectional image capturing apparatus 110 in up-down and left-right directions. In this way, operability may be improved as compared with the case where the position of the pointer P is located at the right edge or the left edge of the screen.

Also, note that the horizontal direction u is changed by the rotation angle $\beta$ around the Y-axis, and the vertical direction v is changed by the rotation angle $\alpha$ around the X-axis. That is, u and $\beta$ correspond to each other, and v and $\alpha$ correspond to each other. In the initial attitude, α is 90 degrees (π/2) and β is 0 degrees. Note that the rotations angle Γ does not affect the coordinates of the pointer P.

Assuming (gα, gβ, gγ) represents the angular velocities around the X, Y and Z axes output by the gyro sensor, the direction of the pointer P (cα, cβ) can be calculated from the following set of equations (1) and (2) using the output of the gyro sensor.

[Math. 1]

$$c\alpha(n+1)=c\alpha(n)+k*g\alpha*dt \quad (1)$$

$$c\beta(n+1)=c\beta(n)+k*g\beta*dt \quad (2)$$

In the above equations (1) and (2), n denotes the calculation cycle and dt denotes the time interval between calculations. Also, k represents a coefficient relating to the sensitivity of the gyro sensor. The initial value of k may be set to k=1.0. In the case of reducing the influence of shaking or the like, the value of k may be reduced to k=0.5, for example, so that the effect of a low pass filter may exhibited. Note that the above calculation is performed at intervals (screen refresh rate) at which the image viewer function is called from the OS of the omnidirectional image capturing apparatus 110.

The direction of the pointer P (cα, cβ) calculated using the above equations (1) and (2) are converted into coordinates (u, v) of the pointer P by the pointer position managing unit 226. Assuming a screen size of (W, H), (1280, 720) [pix], the above screen size corresponds to a horizontal viewing angle of 24 degrees and a vertical viewing angle of 13.5 degrees. Accordingly, 24 degrees may be proportionally distributed to 1280 pixels and 13.5 degrees may be proportionally distributed to 720 pixels. Because (α, β)=(π/2, 0) and (u, v)=(0, 0) correspond to each other, the coordinates of the pointer P may be calculated in the manner described below.

Note that two possible orientations (attitudes) of the omnidirectional image capturing apparatus 110 may be contemplated: the shutter release button SB facing upward when the user holds the omnidirectional image capturing apparatus 110 (FIG. 11) and the shutter release button SB facing downward when the user holds the omnidirectional image capturing apparatus 110. Note that coordinate axes when the shutter release button SB of the omnidirectional image capturing apparatus 110 is facing downward will be described below with reference to FIG. 20.

(Initial Attitude when α_0?−π/2 and α_0>π/2)

In normal operation (state where the shutter release button SB is facing upward), the angle satisfies −π<cα?−π/2 or π/2<cα?π. Because the numbers are not continuous around the angle π, for calculation purposes, the following case classification is made.

When cα?0, cα2=cα
When cα<0, cα2=cα+2π

Then, conversion to (0?cα2<2π) is made so that the numbers are continuous.

The coordinates can be calculated based on the following set of equations (3).

[Math. 2]

$$u=(c\alpha2-\alpha\_0)*180/\pi*W/(24*kd)$$

$$v=(c\beta)*180/\pi*H/(13.5*kd) \quad (3)$$

(Initial Attitude when α_0>−π/2 and α_0?π/2)

In a backside operation (state where the shutter release button SB is facing downward), the angle satisfies −π/2<cα?π/2. Because the numbers are continuous, it is unnecessary to classify cases for purposes of angle calculation.

The coordinates can be calculated based on the following set of equations (4).

[Math. 3]

$$u=(\alpha\_0-c\alpha)*180/\pi*W/(24*kd)$$

$$v=(-c\beta)*180/\pi*H/(13.5*kd) \quad (4)$$

In the above equations (3) and (4), kd denotes the amplification factor of the attitude. The initial value of kd may be set to kd=2. When kd=2, the omnidirectional image capturing apparatus 110 has to be tilted twice as much. When u and v reach the edge of the screen (u=−W/2, W/2, v=−H/2, H/2), they are clipped to the screen edge.

<Initializing Coordinates of Pointer P>

Using the calculated coordinates (u, v), the user can operate the omnidirectional image capturing apparatus 110 with the pointer P. However, due to accumulation of drift of the gyro sensor over time, a discrepancy occurs between the attitude of the omnidirectional image capturing apparatus 110 and the position of the pointer P. When the discrepancy between the attitude of the omnidirectional image capturing apparatus 110 and the position of the pointer P becomes large, operability is degraded.

In this respect, in the present embodiment, when the user feels that the discrepancy is large, the user can initialize the coordinates of the pointer P. At the time of initialization, the user presses the shutter release button SB. However, if the shutter release button SB is pressed while the pointer P is being displayed, the process content determining unit 228 may potentially accept button or icon click operations, for example. Thus, the user first performs an operation of hiding the pointer P.

FIGS. 13A and 13B are diagrams illustrating an example operation of hiding the pointer P. FIG. 13A shows a top view of the display apparatus 180 and the omnidirectional image capturing apparatus 110, and FIG. 13B shows a side view of the display apparatus 180 and the omnidirectional image capturing apparatus 110. In the case where the horizontal viewing angle of the display apparatus 180 is 24 degrees, by orienting the omnidirectional image capturing apparatus 110 toward the right more than 12 degrees or toward the left more than 12 degrees in the horizontal direction with reference to the initial attitude, the omnidirectional image capturing apparatus 110 may be oriented outside the screen of the display apparatus 180. In terms of cα, the omnidirectional image capturing apparatus 110 may be oriented outside the screen of the display apparatus 180 in the case where |cα2−α_0|>50*π/180.

Similarly, with respect to the vertical direction, in the case where the vertical viewing angle is 13.5 degrees, by orienting the omnidirectional image capturing apparatus 110 upwards more than 6.75 degrees or downward more than 6.75 degrees in the vertical direction with respect to the initial attitude, the omnidirectional image capturing apparatus 110 may be oriented outside the screen of the display apparatus 180. In terms of cβ, the omnidirectional image capturing apparatus 110 may be oriented outside the screen of the display apparatus 180 in the case where |cβ|>60*π/180.

When the directions cα and cβ of the pointer P are deviated from the screen of the display apparatus 180 as described above, the pointer position managing unit 226 hides the pointer P. Note that the pointer position managing unit 226 may also make the above determination based on the coordinates (u, v) of the pointer P instead of the directions cα and cβ of the pointer P. Because the user may point to an edge portion of the screen with the pointer P or display an operation screen on a display apparatus 180 with a large screen size, the pointer position managing unit 226 hides the pointer P upon determining that the directions cα and cβ of the pointer P greatly deviate from the screen of the display apparatus 180 (margin is added to the determination criterion). In this way, the user can initialize the coordinates of the pointer P through a simple operation of changing the orientation of the omnidirectional image capturing apparatus 110 toward the left or right, for example, to cause the pointer P to deviate outside the screen.

As shown in FIG. 14, when the user presses the shutter release button SB in a state where the pointer P is hidden (not displayed), the coordinates of the pointer P are initialized. FIG. 14 shows a an example display of the pointer P displayed when its coordinates are initialized. In FIG. 14, the initialized coordinates of the pointer P (display position) correspond to a point at the center of the screen. As shown in FIG. 14, the coordinates of the pointer P can be initialized by a simple operation of pressing the shutter release button SB while orienting the omnidirectional image capturing apparatus 110 substantially toward the center of the screen of the display apparatus 180. After initialization, the user can operate the pointer P more naturally and intuitively using the omnidirectional image capturing apparatus 110.

Note that the user's operation for hiding the pointer P to perform initialization is not limited causing the pointer P to deviate outside the screen as long as it is some special operation that is not normally performed with respect to the pointer P. For example, it may be an operation of the user causing the omnidirectional image capturing apparatus 110 to vibrate, an operation of repeatedly swinging (rotating back and forth around any of the X, Y, Z axes), or the like. The operation for vibrating omnidirectional image capturing apparatus 110 is mainly detected by the acceleration sensor, and the operation for repeatedly swinging the omnidirectional image capturing apparatus 110 is detected by the gyro sensor.

Note that the pointer P does not necessarily have to be hidden before initializing the coordinates of the pointer P. For example, when the omnidirectional image capturing apparatus 110 detects that the shutter release button SB is being pressed for an extended time, the pointer position managing unit 226 may display the pointer P at the center of the screen regardless of the currently display position of the pointer P. When the user finishes pressing the shutter release button SB, the pointer position managing unit 226 completes the initialization. In this case, the user can initialize the coordinates of the pointer P without hiding first hiding the pointer P.

Also, in FIG. 14, the user presses the shutter release button SB with the omnidirectional image capturing apparatus 110 facing substantially toward the center of the screen of the display apparatus 180. Note, however, that the omnidirectional image capturing apparatus 1100 may face any direction when the shutter release button SB is pressed for an extended time. That is, because the omnidirectional image capturing apparatus 110 does not detect its actual orientation, the user can operate (initialize) the pointer P even if the omnidirectional image capturing apparatus 110 is not facing toward the center of the screen. However, if the omnidirectional image capturing apparatus 110 is oriented in some other direction when the shutter release button SB is pressed, a discrepancy between the orientation (attitude) of the omnidirectional image capturing apparatus 110 and the position of the pointer P occurs immediately after the coordinates of the pointer P are initialized. As such, the omnidirectional image capturing apparatus 110 is preferably oriented so that it faces substantially toward the center of the screen of the display apparatus 180 when the shutter release button SB is pressed.

<Hiding Pointer P>

In addition to hiding the pointer P through deliberate operation by the user, there may be situations where the pointer P is preferably hidden through no deliberate user operation. For example, when the user is viewing an image, display of the pointer P may be distracting. Also, when a displayed omnidirectional image is automatically rotated (without the user's operation), the user does not have to perform operations with respect to the displayed image.

In this respect, the omnidirectional image capturing apparatus 110 according to the present embodiment is configured to hide the pointer P when a change in the signal (physical quantity) detected by the attitude sensor over a certain period of time is no more than a predetermined value (within a predetermined range). In this way, the pointer P can be prevented from interfering with the viewing of an image.

Note that even when the pointer P is hidden through no deliberate user operation, the coordinates of the pointer P can still be initialized by the user pressing the shutter release button SB as described above. That is, the user can initialize the coordinates of the pointer P after the pointer P is hidden even if the user does not notice any discrepancy between the pointing direction (attitude) of the omnidirectional image capturing apparatus 110 and the position of the pointer P.

<Accepting Operation>

In the following, operations executed by the omnidirectional image capturing apparatus 110 according to the present embodiment after step S108 of FIG. 6 are described with reference to FIG. 15. FIG. 15 is a flowchart illustrating process operations of the omnidirectional image capturing apparatus 110 displaying an image on the display apparatus 180 and accepting operations.

The process of FIG. 15 is started from step S200 in response to the process of FIG. 6 proceeding to step S108. In step S201, the omnidirectional image capturing apparatus 110 executes a calibration process. The calibration process includes initializing the coordinates of the pointer P as described below. In the calibration process, guidance is provided to prompt the user to point the tip of the omnidirectional image capturing apparatus 110 toward a predetermined direction such as the center of the screen. Then, the initial attitude or initial position of the omnidirectional image capturing apparatus 110 is measured by the sensor measuring unit 214 and the position of the pointer P is initialized to the center of the screen in association with the measured initial state of the omnidirectional image capturing apparatus 110.

In step S202, the omnidirectional image capturing apparatus 110 has the screen output processing unit 222 generate an operation screen relating to a captured image and output the generated operation screen. Thereafter, in steps S203 to S208, based on the movement of the omnidirectional image capturing apparatus 110, process content of operations relating to the captured image on the output operation screen are determined.

In step S203, the omnidirectional image capturing apparatus 110 has the sensor measuring unit 214 measure the physical quantity caused by movement of the omnidirectional image capturing apparatus 110.

In step S204, the non-display determining unit 229 determines whether a change in sensor information is no more than a predetermined value (within predetermined range) over at least a predetermined time period.

In step S205, when the change in sensor information over a predetermined time period exceeds the predetermined value (NO in step S204), the non-display determining unit 229 determines whether the orientation of the omnidirectional image capturing apparatus 110 based on the sensor information is deviated from the screen (outside the screen).

If a positive determination (YES) is made in step S204 or step S205, the pointer position managing unit 226 hides the pointer P (step S213). That is, the pointer position managing unit 226 does not update the position of the pointer P and does not display the pointer P. Note that in some embodiments, the position of the pointer P may be internally calculated and stopped from being displayed.

If negative determinations (NO) are made in step S204 and step S205, the process proceeds to step S206 in which the omnidirectional image capturing apparatus 110 has the pointer position managing unit 226 update the position of the pointer P that points to an object on the operation screen being displayed based on the physical quantity measured by the sensor measuring unit 214.

In step S207, the omnidirectional image capturing apparatus 110 determines whether an additional operation has been performed. The additional operation may be pressing of a hardware button provided at the casing of the omnidirectional image capturing apparatus 110, for example.

In FIG. 15, when it is determined in step S207 that no additional operation has been performed (NO in step S207), the process returns to step S203.

On the other hand, if it is determined in step S207 that an additional operation has been performed (YES in step S207), the process proceeds to step S208. In step S208, the omnidirectional image capturing apparatus 110 has the process content determining unit 208 determine a process content based on the operation screen being output, the pointer P position information, and the additional operation.

In step S209, the omnidirectional image capturing apparatus 110 has the process executing unit 230 execute the process content determined in step S208. In step S210, the omnidirectional image capturing apparatus 110 determines whether a screen transition is required as a result of the process execution. If it is determined in step S210 that a screen transition is required (YES in step S210), the process proceeds to step S212.

In step S212, a transition of the operation screen is performed, and the process is looped to step S202. In this case, in step S202, an operation screen after transition is generated and output.

On the other hand, if it is determined in step S210 that a screen transition is not required (NO in step S210), the process proceeds to step S211. In step S211, the result of executing the process content in step 209 is reflected in the operation screen, and the process is looped to step S203. In this case, the operation screen reflecting the process execution is externally output via the wireless video transmitting unit 216, and the process continues on the operation screen being output.

In this way, the user can physically move the omnidirectional image capturing apparatus 110 while viewing the operation screen that is externally output (e.g., to the display apparatus 180) to thereby move the pointer P to a desired position and perform a desired operation on the operation screen.

<Operation Screen>

In the following, operation screens and transitions of operation screens according to the present embodiment will be described with reference to FIGS. 16 to 18D. FIG. 16 illustrates transitions of operation screens provided by the omnidirectional image capturing apparatus 110 according to the present embodiment. FIGS. 17A to 18D illustrate operation screens provided by the omnidirectional image capturing apparatus 110 according to the present embodiment.

As shown in FIG. 16, the image viewer of the omnidirectional image capturing apparatus 110 starts by displaying an initial screen 300 such as a display of a logo, for example. When a predetermined time elapses after displaying the initial screen 300, a timeline list screen 310 is generated and output in step S202 of FIG. 15.

FIG. 17A illustrates an example of the timeline list screen 310. Referring to FIG. 16, the timeline list screen 310 may transition to a timeline list selection screen 320 and an image list screen 330. The timeline list screen 310 illustrated in FIG. 17A includes a selection button 312 for switching to the timeline list selection screen 320 and a switching button 314 for switching to the image list screen 330.

The timeline list screen 310 of FIG. 17A will be described below as an example. By moving the omnidirectional image capturing apparatus 110, the pointer P may be placed at the position of the selection button 312 or the switching button 314. Further, when an additional operation such as pressing a hardware button of the omnidirectional image capturing apparatus 110 is performed, the process content of a corresponding process to be executed is determined in step S208. The process content may be calling the timeline list selection screen 320 or the image list screen 330, for example. In this case, it is determined in step S210 that a screen transition is required.

FIG. 17B illustrates an example of the timeline list selection screen 320. The timeline list selection screen 320 of FIG. 17B includes a return button 322 for returning to the timeline list screen 310, a check box 324 for selecting a target image to be subjected to processing from among the listed images, and a delete button 326 for deleting a selected image.

The timeline list selection screen 320 of FIG. 17B will be described below as an example. When the pointer P is placed at the position of the delete button 326 by moving the omnidirectional image capturing apparatus 110 in a state where the check box 324 is checked, and an additional operation such as pressing a hardware button is performed, the process content determined in step S208 may be a deletion process of the selected image.

FIG. 17C illustrates an example of the image list screen 330. Referring to FIG. 16, the image list screen 330 may transition to the timeline list screen 310, the image list selection screen 340, a setting screen 350, an omnidirectional still image view screen 360, and an omnidirectional moving image view screen 370. The image list screen 330 of FIG. 17C includes a selection button 332 for switching to the image list selection screen 340, a switching button 334 for switching to the timeline list screen 310, thumbnail images 336, and a setting button 338.

Note that the thumbnail images may be displayed using an omnidirectional image display format such as the so-called "little planet". The thumbnail images may be created in the background by detecting idle time of the omnidirectional image capturing apparatus 110, or updated at the time of redisplay such as when the pointer P is brought to the lower side of the image list screen 330, for example.

Although no clear control is arranged on the image list screen 330, for example, scrolling may be performed when the pointer P is brought to the upper side or the lower side of the image list screen 330 and held at the position for a certain time. Also, in a preferred embodiment, when a large number of images are list displayed in the image list screen 330 of FIG. 17C, a function for performing high-speed scrolling may be provided depending on the number of images to be displayed. For example, the scrolling speed may be arranged to vary depending on the number of images to be displayed. When the number of images to be displayed is relatively small, the scrolling speed may be set to a constant speed, and when the imaged to be displayed do not fit within one screen, the scrolling speed may be increased after a certain period of time, for example.

Note that in a list display of files, only files that can be displayed may be listed, or all the files recorded in a folder may be listed, for example. Also, in some embodiments, the pointer P may be freely moved to a desired thumbnail image in a list display to select a desired image, for example. In other embodiments, a file list or a list of thumbnail images may be automatically scrolled, and when an additional operation such as pressing a hardware button is performed, an image corresponding to the thumbnail image indicated by the pointer P may be selected at this time, for example.

FIG. 17D illustrates an example of the image list selection screen 340. The image list selection screen 340 of FIG. 17D has substantially the same configuration as the timeline list selection screen 320 of FIG. 17B and includes a return button 342 and a delete button 344.

FIG. 18A illustrates an example of the setting screen 350. The setting screen 350 of FIG. 18A displays various settings and further includes a switching button 352 for switching to the image list screen 330. Also, the setting screen 350 may include a setting screen for switching the connection destination from the current connection destination to another wireless communication apparatus, for example.

The image list screen 330 of FIG. 17C will be described below as an example. When the pointer P is placed at the position of a predetermined thumbnail image 336 and an additional operation such as pressing a hardware button is performed, in step S208, a process of calling the omnidirectional still image view screen 360 as illustrated in FIG. 18B or the omnidirectional moving image view screen 370 as illustrated in FIG. 18C may be determined as the process content. In this case, it is determined in step S210 that a screen transition is required.

FIG. 18B illustrates an example of the omnidirectional still image view screen 360. The omnidirectional still image view screen 360 of FIG. 18B may be called when an image corresponding to the thumbnail image where the pointer P is located is a still image. The omnidirectional still image view screen 360 of FIG. 18B includes a display area 362 of an omnidirectional still image and various controls 374.

FIG. 18C illustrates an example of the moving image view screen 370. The omnidirectional moving image view screen 370 of FIG. 18C is called when an image corresponding to the thumbnail image where the pointer P is located is a moving image. The omnidirectional moving image view screen 370 of FIG. 18C includes a display area 372 of an omnidirectional moving image, various controls 374, and a replay button 376 for accepting a moving image replay instruction.

For example, when an operation corresponding to pressing the replay button 376 is performed on the moving image view screen 370 of FIG. 18C, which illustrates a state before the moving image is replayed, replay of the moving image is started within the display area 372 on the same operation screen as illustrated in FIG. 18D, and such a change in state is reflected in the controls 374' displayed on the moving image view screen 370. In this case, it is determined in step S210 that a screen transition is not required.

With respect to the omnidirectional image view screens as illustrated in FIGS. 18B to 18D, the user may change the position of the pointer P by moving the omnidirectional image capturing apparatus 110, and in response, process operations such enlarging, reducing, rotating, or changing the viewpoint of the image displayed on the operation screen of the omnidirectional image capturing apparatus 110 may be performed based on the position of the pointer P. Also, based on such operation, a corresponding change in the operation screen being displayed may be reflected. For example, the user may tilt the omnidirectional image capturing apparatus 110 in the up, down, left, or right direction as illustrated in FIG. 2 to move the pointer P toward the upper edge, lower edge, left edge, or right edge of the operation screen, for example, and when the pointer P is located at this position, the user may press a button or wait for a certain time period to perform an operation of moving the image viewpoint or the like. Also, while pressing a hardware button and orienting the tip of the omnidirectional image capturing apparatus 110 toward the operation screen, the user may move the omnidirectional image capturing apparatus 110 in the up, down left, or right direction to move the image viewpoint, for example. Also, the user may move the omnidirectional image capturing apparatus 110 in the up, down, left, or right direction without pressing a hardware button to move a cursor, for example. Further, the user may move a cursor to an enlarge icon or a reduce icon on the operation screen and press a hardware button to change the image size (magnification), or select an enlarge/reduce option from a menu and move the omnidirectional image capturing apparatus 110 up or down to select a desired magnification, for example.

FIG. 19 illustrates an example operation screen including a message for explaining to the user how to initialize the coordinates of the pointer P to be displayed on the operation screen when the pointer P is not displayed. In the operation screen of FIG. 19, a message 365 describing the initialization method is displayed at a location that does not overlap with the omnidirectional image being displayed. By viewing the message 365, the user can understand that the coordinates of the pointer P have to be initialized and how to perform the initialization. Note that in FIG. 19, the message 365 is displayed on the omnidirectional still image view screen 360. However, the message 365 may be displayed on any operation screen on which the pointer P is not displayed.

Note that the message 365 describing the initialization method may continuously be displayed while the pointer P is not displayed or may be displayed for a certain period of time immediately after the pointer P is hidden, for example. Also, the message 365 may be repeatedly displayed and hidden at predetermined time intervals, for example. That is, the message 365 may be displayed only during a part of the time during which the pointer P is hidden. Further, in some embodiments, the message 365 may be displayed in response to the sensor measuring unit 214 detecting that the omnidirectional image capturing apparatus 110 has been moved by the user, for example. Note that the screen output processing unit 222 generates the message 365 together with the operation screen.

Although specific examples of operation screens of the omnidirectional image capturing apparatus 110 have been described above with reference to FIGS. 16 to 19, operation screens of the omnidirectional image capturing apparatus 110 are not limited to the specific examples described above. An operation screen according to an embodiment of the present invention is operated by the user holding the omnidirectional image capturing apparatus 110 with his/her hand and causing a sensor to detect movement of the omnidirectional image capturing apparatus 110. As such, in a preferred embodiment, the operation screen may be configured to include controls such as tiles, buttons, icons, and the like associated with process contents to enable selection of a desired process content, and in this way, operability may be improved. Also, the operation screen may be configured to display a menu near the pointer P only while a predetermined hardware button is pressed, for example. Further, while such a menu is displayed near the pointer P, the operation screen may be configured to enlarge the area displaying the menu near the pointer P, for example.

<When User Holds Omnidirectional Image Capturing Apparatus with Shutter Release Button facing Downward>

It may be presumed that the user will hold the omnidirectional image capturing apparatus 110 so that the shutter release button SB faces upward when initializing the coordinates of the pointer P while the pointer P is not displayed. However, there may be cases where the user holds the omnidirectional image capturing apparatus 110 with the shutter release button SB facing downward. In such case, there will be a mismatch between the orientation of the omnidirectional image capturing apparatus 110 and the movement direction of the pointer P. Thus, as described below, the omnidirectional image capturing apparatus 110 may be configured to detect that the user is holding the omnidirectional image capturing apparatus 110 with the shutter release button SB facing downward and change the processing method for processing the signal output by the gyro sensor.

FIG. 20 is a diagram illustrating the coordinate axes in the case where the user holds the omnidirectional image capturing apparatus 110 with the shutter release button SB facing downward. In FIG. 20, the X-axis and the Y-axis are turned 180 degrees to be oriented in opposite directions with respect to the orientations of the X-axis and Y-axis illustrated in FIG. 11. Note that there is no change in the Z-axis. In this case, the positive/negative sign for the rotation angles of the omnidirectional image capturing apparatus 110 around the X-axis and the Y-axis also are opposite those of FIG. 11. Thus, when the user holds the omnidirectional image capturing apparatus 110 with the shutter release button SB facing downward, the pointer position managing unit 226 reverses the positive/negative sign for the rotation angles measured by the sensor measuring unit 214 and calculates the coordinates of the pointer P (cα, cβ) using the above set of equations (4). In this way, even when the user holds the omnidirectional image capturing apparatus 110 with the shutter release button SB facing downward, the pointer P may be moved in a direction in which the user is moving the omnidirectional image capturing apparatus 110 in the upside down orientation.

Note that whether the user is holding the omnidirectional image capturing apparatus 110 with the shutter release button SB facing downward can be determined based on the signal of the acceleration sensor when the shutter release button SB is pressed, for example. That is, in the state as illustrated in FIG. 20, gravity acts in a direction opposite the Y-axis direction. Thus, by detecting the direction of gravity when the shutter release button SB is pressed, the pointer position managing unit 226 can determine the orientation in which the omnidirectional image capturing apparatus 110 is held by the user.

FIG. 21 is a flowchart illustrating example process operations for changing the calculation method for calculating the orientation of the omnidirectional image capturing apparatus 110 when the user holds the omnidirectional image capturing apparatus 110 with the shutter release button SB facing downward. The process of FIG. 21 may be executed during the calibration process of step S201 of FIG. 15, for example. That is, the process of FIG. 21 is executed in a state where the pointer P is not displayed.

In step S301, the process content determining unit 228 determines whether the shutter release button SB has been pressed. Note that the determination in step S301 is repeated until the shutter release button SB is pressed.

If it is determined that the shutter release button SB has been pressed (YES in step S301), the pointer position managing unit 226 acquires a signal of the acceleration sensor from the sensor measuring unit 214 (step S302).

Then, the pointer position managing unit 226 determines whether the direction of gravity is in the Y-axis direction based on the signal of the acceleration sensor (step S303).

If it is determined that the direction of gravity is in the Y-axis direction (YES in step S303), this means that the user is holding the omnidirectional image capturing apparatus 110 with its front side (shutter release button SB side) facing upward. As such, the pointer position managing unit 226 does not change the positive/negative sign for the rotation angles detected by the gyro sensor and calculates the coordinates of the pointer P using the above set of equations (3) (step S304).

On the other hand, if it is determined that the direction of gravity is in the opposite direction with respect to the Y-axis direction (NO in step S303), this means that the user is holding the omnidirectional image capturing apparatus 110 with its back side facing upward. As such, the pointer position managing 226 reverses the positive/negative sign for the rotation angles detected by the gyro sensor and calculated the coordinates of the pointer P using the above set of equation (4) (step S305).

By implementing such process, even when the user is holding the omnidirectional image capturing apparatus 110 with the back side facing upward, the user may be able to easily control the pointer P.

SUMMARY

According to an aspect of the above-described embodiments, the coordinates of the pointer P may be initialized when the user presses the shutter release button SB while the pointer P is not displayed, and in this way, the direction pointed by the omnidirectional image capturing apparatus 110 and the position of the pointer P may be accurately correlated and the occurrence of a discrepancy between the position of the pointer P and the attitude of the omnidirectional image capturing apparatus 110 corresponding to a sender apparatus may be prevented.

Other Application Examples

Although the present invention has been described above by way of illustrative embodiments and examples, the present invention is not limited to these embodiments and examples and various substitutions and modifications may be made without departing from the scope of the present invention.

For example, the functions of the above-described embodiments may be implemented by one or a plurality of processing circuits. Note that the term "processing circuit" as used in the present specification may include a processor programmed to execute a function by software, such as a processor implemented by an electronic circuit, and various types of devices designed to execute one or more of the functions described above, such as an ASIC (application specific integrated circuit), a DSP (digital signal processor), a FPGA (field programmable gate array), a SOC (system on chip), a GPU (Graphics Processing Unit), and conventional circuit modules, for example.

Also, software for implementing functions of the present embodiment may be stored in an device-readable recording medium such as a flash memory, a flexible disk, a CDROM, a CD-RW, a DVD-ROM, a DVD-RAM, a DVD-RW, a Blu-ray disk, an SD card, an MO, and the like, or distributed through a telecommunication line, for example.

Also, the initial position of the pointer P does not necessarily have to be at the center of the operation screen and may also be at the upper right corner of the operation screen, the lower right corner of the operation screen, the lower left corner of the operation screen, or the upper left corner of the operation screen, for example. Moreover, the initial position of the pointer P may be set to any desired position on the operation screen. By having the user point to the initial position of the pointer P using the omnidirectional image capturing apparatus 110, the orientation (attitude) of the omnidirectional image capturing apparatus 110 may be accurately correlated with the position of the pointer P.

Also, in the above-described embodiments, the coordinates of the pointer P are initialized by pressing the shutter release button SB. However, the operation for triggering the initialization of the pointer P is not limited to pressing the shutter release button SB but may be an operation of pressing some other hardware button, for example. Also, the operation for triggering the initialization of the pointer may be an operation of pressing a hardware button including the shutter release button SB for an extended time of several seconds, for example. Also, in the case where the omnidirectional image capturing apparatus 110 includes a touch panel, an operation of pressing of a soft key displayed on the touch panel may be a trigger for initializing the coordinates of the pointer P, for example. Further, in some embodiments, the coordinates of the pointer P may be initialized in response to a voice input such as a voice commanding "initialize".

Also, although the omnidirectional image capturing apparatus 110 as a single unit is configured to display the pointer P in the above-described embodiments, an information processing apparatus having an omnidirectional image capturing function externally attached thereto can also display the pointer P. Examples of such an information processing apparatus include a personal computer, a smartphone, a tablet computer, and the like. Also, the omnidirectional image capturing apparatus 110 may be regarded as an information processing apparatus having a built-in omnidirectional image capturing function, for example.

Also, in some embodiments, a plurality of display apparatuses 180 may be connected. For example, two or more display apparatuses may be connected to one personal computer, and the personal computer may use the two or more display apparatuses as one display. In such case, the omnidirectional image capturing apparatus 110 can enlarge an image display range and have the two or more display apparatuses jointly display one single image (operation screen), for example. The omnidirectional image capturing apparatus 110 may also display the same image on the two or more display apparatuses, for example. Note that in the case where two display apparatuses are connected and one operation screen is jointly by the two display apparatuses, when the pointer P is displayed at the center of the operation screen, the pointer P may exist at the boundary between the two display screens of the two display apparatuses, making it difficult for the user to see the pointer P. Thus, in the case where two display apparatuses are connected, the pointer P is preferably displayed at a position other than the center in the width direction of the operation screen. Note that the omnidirectional image capturing apparatus 110 may determine whether two or more display apparatuses are connected based on a user setting, an image resolution, or the like, for example.

Note that the screen output processing unit 222 of the above-described embodiment is an example of a generating unit, the sensor measuring unit 214 is an example of an attitude information acquiring unit, the pointer position managing unit 226 is an example of a position display component managing unit, the pointer P is an example of a position display component, the shutter release button SB (process content determining unit 228) is an example of an operation accepting unit, and the non-display determining unit 229 is an example of a non-display determining unit. The wireless video transmitting unit 216 is an example of an output unit.

The present application is based on and claims the benefit of the priority date of Japanese Patent Application No. 2017-164794 filed on Aug. 29, 2017, with the Japanese Patent Office, the entire contents of which are hereby incorporated by reference.

The invention claimed is:

1. An image capturing apparatus comprising:
a storage configured to store a captured image; and
circuitry configured to
generate an operation screen relating to the captured image stored in the storage;
output the generated operation screen to a display apparatus;
acquire attitude information relating to an attitude of the image capturing apparatus;
convert the acquired attitude information into position information relating to a position of a position display component on the operation screen and display the position display component on the operation screen based on the converted position information;
accept an initialization operation of initializing the position of the position display component; and
determine to hide the position display component when a predetermined condition is satisfied;
wherein the circuitry is configured to display the position display component at an initial position of the operation screen in response to the circuitry accepting the initialization operation;
wherein the circuitry is configured to display the position display component at the initial position of the operation screen in response to the circuitry accepting the initialization operation at a time when the position display component is hidden in response to the circuitry determining to hide the position display component; and
wherein when the circuitry accepts the initialization operation while the circuitry is hiding the position display component, the circuitry determines the attitude of the image capturing apparatus based on a signal measured by an acceleration sensor and changes a processing method for processing the acquired attitude information based on the determined attitude.

2. The image capturing apparatus according to claim 1, wherein the circuitry is configured to determine to hide the position display component when the circuitry acquires predetermined attitude information relating to a predetermined attitude of the image capturing apparatus.

3. The image capturing apparatus according to claim 2, wherein
the circuitry is configured to determine to hide the position display component when the acquired predetermined attitude information indicates that an orientation in which the image capturing apparatus is oriented has deviated from a predetermined range.

4. The image capturing apparatus according to claim 3, wherein
the circuitry is configured to determine to hide the position display component when the acquired predetermined attitude information indicates that the orientation in which the image capturing apparatus is oriented has deviated from a screen of the display apparatus.

5. The image capturing apparatus according to claim 1, wherein
the circuitry is configured to determine to hide the position display component when the acquired attitude information indicates that a change in the attitude of the image capturing apparatus is less than or equal to a predetermined value over at least a predetermined time period.

6. The image capturing apparatus according to claim 1, wherein the initial position of the operation screen is at a center of the operation screen.

7. The image capturing apparatus according to claim 1, wherein
the circuitry is configured to display information describing a method of initializing the position of the position display component on the operation screen for at least a part of a period during which the circuitry hides the position display component.

8. An image display system including an image capturing apparatus and a communication apparatus of a display apparatus that is capable of communicating with the image capturing apparatus, the image display system comprising:
a storage configured to store a captured image; and
circuitry configured to
generate an operation screen relating to the captured image stored in the storage;
output the generated operation screen to the display apparatus;
acquire attitude information relating to an attitude of the image capturing apparatus;
convert the acquired attitude information into position information relating to a position of a position display component on the operation screen and display the position display component on the operation screen based on the converted position information;
accept an initialization operation of initializing the position of the position display component;
output the operation screen to the communication apparatus; and
determine to hide the position display component when a predetermined condition is satisfied;
wherein the circuitry is configured to display the position display component at an initial position of the operation screen in response to the circuitry accepting the initialization operation;
wherein the communication apparatus includes the display apparatus or is connected to the display apparatus, and the communication apparatus causes the display apparatus to display the operation screen output by the output unit of the image capturing apparatus;
wherein the circuitry is configured to display the position display component at the initial position of the operation screen in response to the circuitry accepting the initialization operation at a time when the position display component is hidden in response to the circuitry determining to hide the position display component; and
wherein when the circuitry accepts the initialization operation while the circuitry is hiding the position display component, the circuitry determines the attitude of the image capturing apparatus based on a signal measured by an acceleration sensor and changes a processing method for processing the acquired attitude information based on the determined attitude.

9. An operation method implemented by an image capturing apparatus, the operation method comprising:
generating an operation screen relating to an image stored in a storage;
outputting the generated operation screen to a display apparatus;
acquiring attitude information relating to an attitude of the image capturing apparatus;
converting the acquired attitude information into position information relating to a position of a position display component on the operation screen and displaying the position display component on the operation screen based on the converted position information;
accepting an initialization operation of initializing the position of the position display component;
displaying the position display component at an initial position of the operation screen in response to accepting the initialization operation; and
determining to hide the position display component when a predetermined condition is satisfied;
wherein the displaying comprises displaying the position display component at the initial position of the operation screen in response to accepting the initialization operation at a time when the position display component is hidden in response to determining to hide the position display component; and
wherein when the initialization operation is accepted while the position display component is hidden, the attitude of the image capturing apparatus is determined based on a signal measured by an acceleration sensor, and a processing method for processing the acquired attitude information is changed based on the determined attitude.

* * * * *